United States Patent
Egawa

(10) Patent No.: US 11,781,854 B2
(45) Date of Patent: Oct. 10, 2023

(54) ROTATION SENSING DEVICE

(71) Applicant: Hirose Electric Co., Ltd., Yokohama (JP)

(72) Inventor: Kosuke Egawa, Yokohama (JP)

(73) Assignee: Hirose Electric Co., Ltd., Yokohama (JP)

( * ) Notice: Subject to any disclaimer, the term of this patent is extended or adjusted under 35 U.S.C. 154(b) by 0 days.

(21) Appl. No.: 17/583,856

(22) Filed: Jan. 25, 2022

(65) Prior Publication Data
US 2022/0236045 A1 Jul. 28, 2022

(30) Foreign Application Priority Data
Jan. 26, 2021 (JP) .................. 2021-010607

(51) Int. Cl.
*G01B 7/30* (2006.01)
*G01D 5/20* (2006.01)

(52) U.S. Cl.
CPC ........ *G01B 7/30* (2013.01); *G01D 5/20* (2013.01)

(58) Field of Classification Search
CPC .......... G09G 3/006; G09G 2320/0247; G09G 2320/046; G09G 3/36; G09G 2320/0204; G02F 1/1309; H04N 17/04; G01D 5/24495; G01D 5/245
See application file for complete search history.

(56) References Cited

U.S. PATENT DOCUMENTS

| 9,163,926 B2 * | 10/2015 | Sasaki | G01D 5/2452 |
| 2011/0285386 A1 * | 11/2011 | Kikuchi | G01D 5/2013 29/598 |
| 2012/0176126 A1 * | 7/2012 | Naganuma | G01R 33/091 324/207.25 |
| 2022/0196380 A1 * | 6/2022 | Saito | G01B 7/30 |

FOREIGN PATENT DOCUMENTS

| WO | 2016/002437 A1 | 1/2016 |
| WO | 2016/021074 A1 | 2/2016 |

* cited by examiner

*Primary Examiner* — Akm Zakaria
(74) *Attorney, Agent, or Firm* — Procopio, Cory, Hargreaves & Savitch LLP

(57) ABSTRACT

The rotation sensing device comprises a magnet, magnetic sensors, and yokes, which are secured to the base and control the magnetic flux of the magnetic field formed by the magnet; each magnetic sensor comprises a magnetic wire, a coil, and a bobbin; each yoke comprises a left yoke piece and a right yoke piece partially covering the left portion and the right portion of the magnetic sensor; the left yoke piece has a left front plate portion, the left front plate portion, which extends linearly from the front of the left portion of the bobbin, which is to the left of the section where the coil is provided, all the way to the front of the coil, and is inclined with respect to the direction of extension of the magnetic wire such that the right end thereof is located rearwardly of left end thereof.

5 Claims, 8 Drawing Sheets

ROTATION SENSING DEVICE

CROSS-REFERENCE TO RELATED APPLICATIONS

This application claims priority to Japanese Patent Application No. 2021-010607, filed Jan. 26, 2021, the contents of which are incorporated herein by reference in its entirety for all purposes.

BACKGROUND

Technical Field

The present invention relates to a rotation sensing device for sensing the rotation of an object through the use of magnetism.

Related Art

Patent Document 1 below has described a rotation sensing device that employs a large Barkhausen effect as a rotation sensing device for sensing the rotation of an object through the use of magnetism. To illustrate the basic structure of a rotation sensing device that employs a large Barkhausen effect, let us consider, for example, a case in which the rotation of a rotary shaft in a motor is sensed with the help of a rotation sensing device that employs a large Barkhausen effect.

The rotation sensing device that employs a large Barkhausen effect comprises a magnet and multiple magnetic sensors. The magnet is secured, for example, to a rotary shaft and rotates along with the rotary shaft. Since the N poles and S poles of the magnet rotate along with the rotary shaft, this forms a magnetic field (a rotating magnetic field) that rotates about the rotary shaft. The multiple magnetic sensors are secured, for example, to the housing of the motor, etc. The multiple magnetic sensors are arranged in a fixed, spaced-apart relationship in the circumferential direction on the outer periphery of the rotational trajectory of the magnet and sense the rotating magnetic field formed by the magnet. Each magnetic sensor comprises a magnetic wire that produces a large Barkhausen effect and a coil arranged on the outer periphery of the magnetic wire. As the magnet rotates along with the rotary shaft and a rotating magnetic field is formed around the rotary shaft, each magnetic sensor is placed in the rotating magnetic field. Consequently, as the rotary shaft rotates, the direction of the magnetic field around each magnetic sensor changes and the direction of magnetization of the magnetic wire of each magnetic sensor is reversed in response to changes in the direction of the magnetic field. When the direction of magnetization of the magnetic wire is reversed, a pulse is output from the coil. The rotation of the rotary shaft can be sensed based on this pulse.

In addition, a rotation sensing device that employs a large Barkhausen effect, in which yokes are provided on the outer periphery of the rotational trajectory of the magnet, has been described in Patent Document 2 hereinbelow. The yokes, which are secured to the housing of the motor, etc., along with the multiple magnetic sensors, are arranged to partially cover the section facing the rotational trajectory of the magnet in each magnetic sensor. The yokes have the ability to control the direction of the magnetic flux of the rotating magnetic field such that the magnetic flux passes through the magnetic wire of each magnetic sensor in the direction of extension thereof. Providing the yokes makes it possible to focus the magnetic flux of the rotating magnetic field on the magnetic wire of each magnetic sensor and increase the accuracy with which the rotation of the rotary shaft is sensed.

PATENT DOCUMENTS

Patent Document 1

International Publication No. 2016/002437

Patent Reference 2

International Publication No. 2016/021074

SUMMARY

Problems to be Solved

As devices such as motors and so forth, to which rotation sensing devices that employ a large Barkhausen effect are applied, become more compact, reducing the dimensions of rotation sensing devices that employ a large Barkhausen effect becomes more desirable. Rotation sensing devices that employ a large Barkhausen effect can be made more compact by shortening the spacing between the magnetic sensors as well as the spacing between the magnet and each magnetic sensor. However, if a rotation sensing device that employs a large Barkhausen effect comprises yokes, such as in the case of the rotation sensing device described in Patent Document 2, the yokes are arranged between the magnetic sensors as well as between the magnet and each magnetic sensor, thereby making it difficult to shorten the spacing between the magnetic sensors as well as the spacing between the magnet and each magnetic sensor.

In addition, rotation sensing devices that employ a large Barkhausen effect can be made more compact by making the magnet smaller or by shortening the length of the magnetic wire of each magnetic sensor. However, if the magnet is made smaller or the length of the magnetic wire of each magnetic sensor is shortened, the voltage of the pulse output from the coil will be reduced, thereby making it difficult to improve the accuracy of rotation sensing. Accordingly, in order to minimize the reduction in the voltage of the pulse output from the coil, it would be desirable to increase the degree to which the magnetic flux of the rotating magnetic field is focused on the magnetic wire with the help of a yoke. In order to meet such demands, it is necessary to explore yoke shapes capable of increasing the degree to which magnetic flux is focused on the magnetic wire.

The present invention was made by considering problems such as those described above and it is an object of the invention to provide a rotation sensing device which, despite being equipped with yokes, can be made more compact and the accuracy of rotation sensing can be improved.

Technical Solution

It is an object of the present disclosure to make a rotation sensing device equipped with yokes more compact while improving the accuracy of rotation sensing.

In order to eliminate the above problems, the inventive rotation sensing device is a rotation sensing device that is provided within a structure having a supporting portion and a rotating portion which rotates, in relative terms, with respect to the supporting portion, and that senses the rotation of the rotating portion with respect to the supporting portion, wherein the device comprises: a base that is secured to the supporting portion and has one face parallel to a plane orthogonal to the rotational axis of the rotating portion; a magnetic field forming portion that is secured to the rotating portion, rotates along with the rotating portion about the rotational axis, and forms a magnetic field around the periphery of the rotational axis; a plurality of magnetic field sensing portions that are secured to said one face of the base, are arranged with equal angular spacing to one another in the circumferential direction on the outer periphery of the rotational trajectory of the magnetic field forming portion, and sense the magnetic field formed by the magnetic field forming portion; and a plurality of yokes that are secured to said one face of the base, are arranged on the outer periphery of the rotational trajectory in one-to-one correspondence with the plurality of magnetic field sensing portions, and control the magnetic flux of the magnetic field formed by the magnetic field forming portion; the magnetic field sensing portions comprise a magnetic wire extending in a direction parallel to the tangent of the rotational trajectory, a coil provided on the outer periphery of the magnetic wire, and a bobbin holding the magnetic wire and the coil; and, for each magnetic field sensing portion, the direction of extension of the rotational axis is the up-down direction, the direction of extension of the magnetic wire is the left-right direction, the direction of extension of a straight line orthogonal to both the rotational axis and the magnetic wire is the forward-backward direction, the direction in which said one face of the base is facing is "up", the direction toward the rotational axis in the forward-backward direction is "front", the left and right of each magnetic field sensing portion are defined by viewing each magnetic field sensing portion from the front thereof as a point of reference, the bobbin is formed in a columnar shape extending in the left-right direction; a wire receiving portion, in which the magnetic wire is received, is formed inside the bobbin; a conductor winding portion, which is the central portion of the bobbin in the left-right direction and around which the conductor wire of the coil is wound, is formed on the outer periphery of the wire receiving portion; each yoke comprises a left yoke piece that partially covers the left portion of the magnetic field sensing portion, and a right yoke piece that partially covers the right portion of the magnetic field sensing portion; the left yoke piece has a left front plate portion, which extends linearly from the front of the left portion of the bobbin, which is left of the conductor winding portion, to the front of the coil; the left front plate portion is inclined with respect to the direction of extension of the magnetic wire such that the right end of said left front plate portion is located rearwardly of the left end of said left front plate portion; the right yoke piece has a right front plate portion, which extends linearly from the front of the right portion of the bobbin, which is right of the conductor winding portion, to the front of the coil; the right front plate portion is inclined with respect to the direction of extension of the magnetic wire such that the left end of said right front plate portion is located rearwardly of the right end of said right front plate portion; and the right end of the left front plate portion and the left end of the right front plate portion are mutually opposed across a gap in front of the central portion of the coil in the left-right direction.

In addition, in the inventive rotation sensing device, the left yoke piece may be adapted to have a left plate portion covering the bobbin from the left side of said bobbin, with the left plate portion being inclined with respect to a straight line orthogonal to both the rotational axis and the magnetic wire such that the rear end of said left plate portion is located to the left of the front end of said left plate portion, and the right yoke piece may be adapted to have a right plate portion covering the bobbin from the right side of said bobbin, with the right plate portion being inclined with respect to a straight line orthogonal to both the rotational axis and the magnetic wire such that the rear end of said right plate portion is located to the right of the front end of said right plate portion. In this case, the left plate portion may be adapted to be inclined with respect to a straight line orthogonal to both the rotational axis and the magnetic wire by an angle equal to one-half the angular spacing such that the rear end of said left plate portion is located to the left of the front end of said left plate portion, and the right plate portion may be adapted to be inclined with respect to a straight line orthogonal to both the rotational axis and the magnetic wire by an angle equal to one-half the angular spacing such that the rear end of said right plate portion is located to the right of the front end of said right plate portion. Furthermore, the left plate portion may be adapted to cover only the section of the bobbin forward of the center in the forward-backward direction from the left side of said bobbin, and the right plate portion may be adapted to cover only the section of the bobbin forward of the center in the forward-backward direction from the right side of said bobbin.

In addition, the inventive rotation sensing device may be adapted to have a structure in which the plurality of magnetic field sensing portions and the plurality of yokes are arranged respectively in one-to-one correspondence on said one face of the base on an arc centered on the rotational axis, and, when said one face is viewed from above the plurality of magnetic field sensing portions, a first dummy yoke piece having the same configuration as the left yoke piece is arranged on the clockwise side of the magnetic field sensing portion arranged on the most clockwise side among the plurality of magnetic field sensing portions, a second dummy yoke piece having the same configuration as the right yoke piece is arranged on the counterclockwise side of the magnetic field sensing portion arranged on the most counterclockwise side among the plurality of magnetic field sensing portions, and, on said one face, there are neither magnetic field sensing portions corresponding to the first dummy yoke piece nor magnetic field sensing portions corresponding to the second dummy yoke piece.

Technical Effect

According to the present invention, despite being equipped with yokes, the rotation sensing device can be made more compact and the accuracy of rotation sensing can be improved.

DETAILED DESCRIPTION (Rotation Sensing Device)

Figure 1:
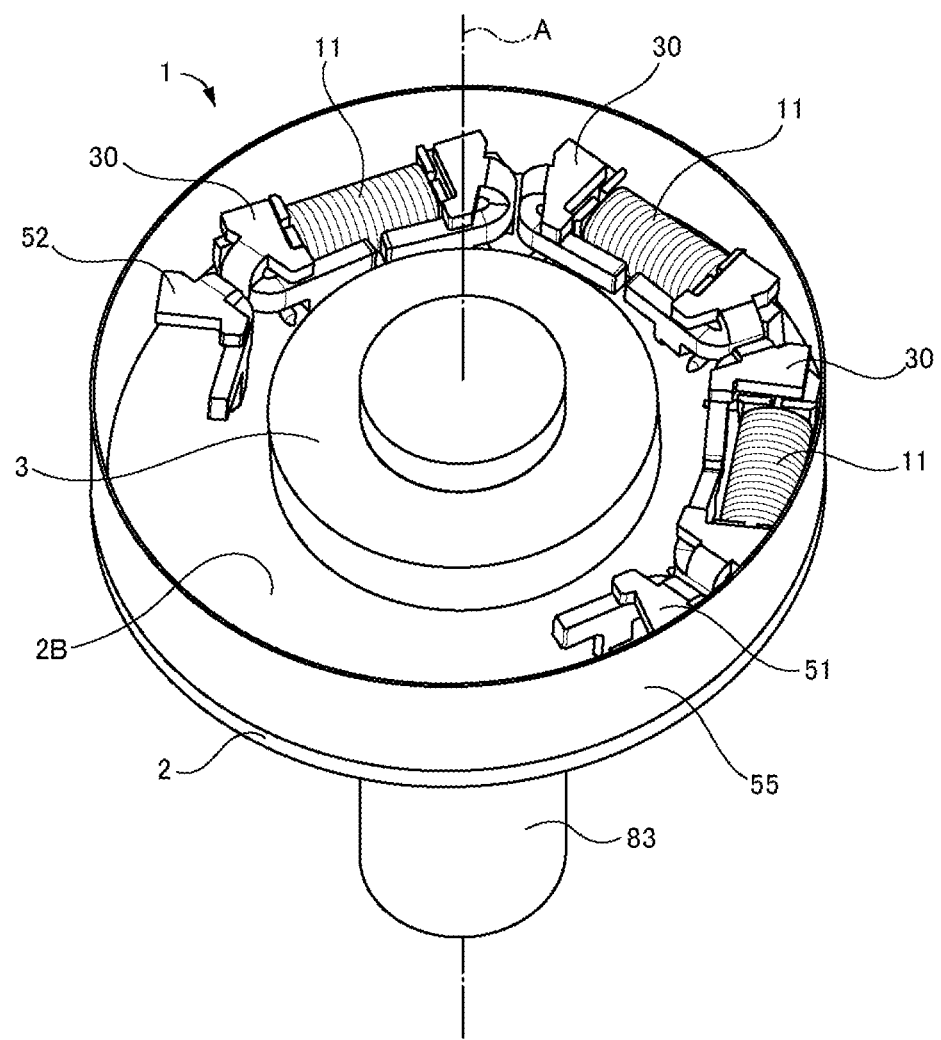
FIG. 1 is a perspective diagram showing a rotation sensing device, etc., according to an embodiment of the present invention.
Figure 2:
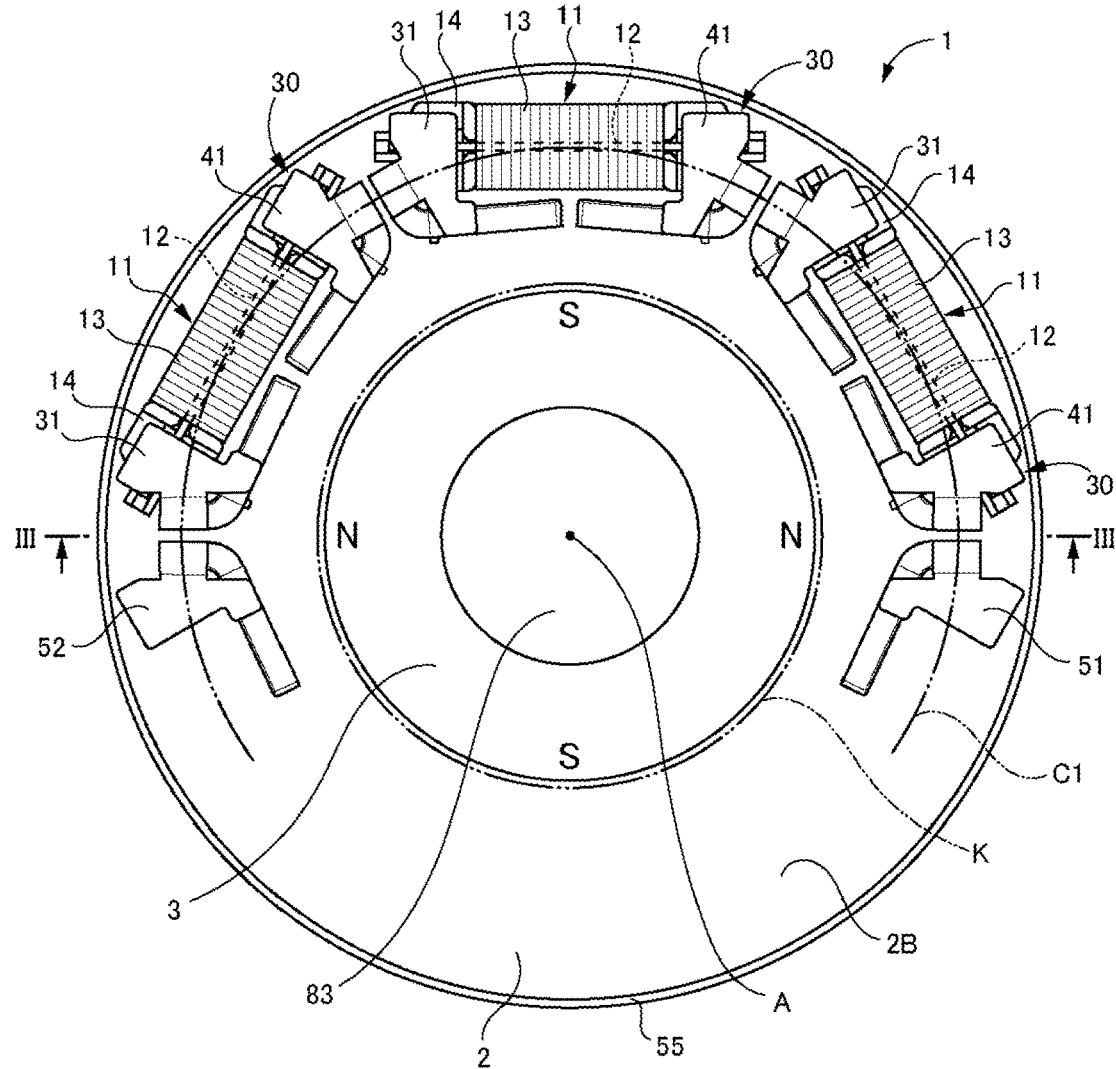
FIG. 2 is an illustrative diagram showing the rotation sensing device according to the embodiment of the present invention, as viewed from above in FIG. 1.
Figure 3:
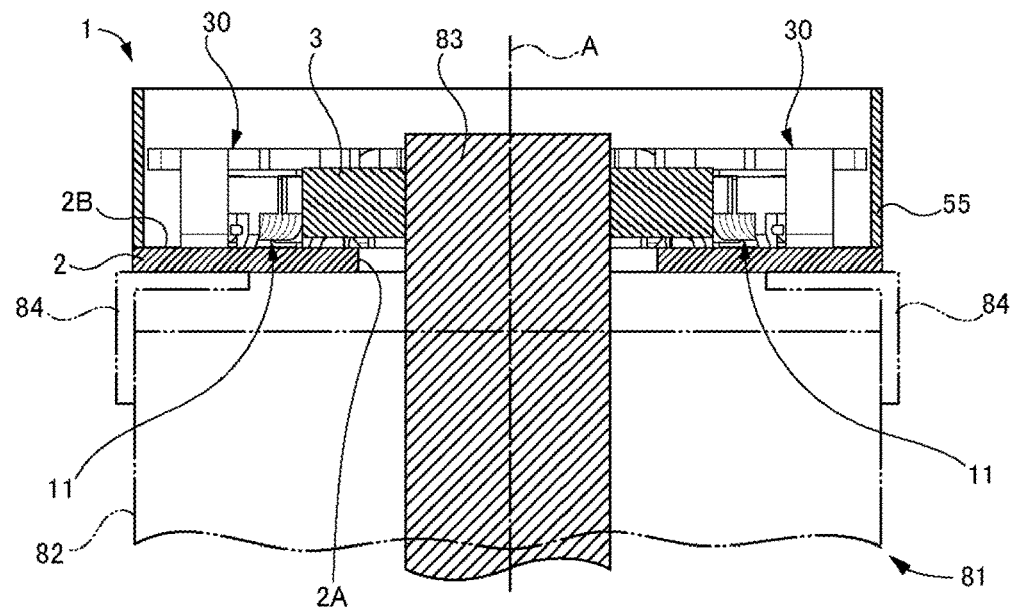
FIG. 3 is a cross-sectional diagram showing a cross-section of the rotation sensing device according to the embodiment of the present invention taken along section line in FIG. 2, as viewed from below in FIG. 2.

FIG. 1 shows a rotation sensing device 1 along with a rotary shaft 83 according to an embodiment of the present invention. FIG. 2 shows the rotation sensing device 1 as viewed from above in FIG. 1. FIG. 3 shows a cross-section of the rotation sensing device 1 taken along section line in FIG. 2, as viewed from below in FIG. 2.

The rotation sensing device 1 is a device for sensing the rotation of an object that employs a large Barkhausen effect. The present embodiment illustrates a case in which the rotation sensing device 1 is applied to a motor 81. As shown in FIG. 3, the motor 81 is provided with a motor main body 82 and a rotary shaft 83. The rotary shaft 83 rotates relative to the motor main body 82. The motor main body 82, which has a mechanism for rotating the rotary shaft 83 as well as a housing that holds this mechanism, etc., rotatably supports the rotary shaft 83. The rotation sensing device 1 is provided in the motor 81 and senses the rotation of the rotary shaft 83. It should be noted that the motor 81 is a specific example of the structure, the motor main body 82 is a specific example of the supporting portion, and the rotary shaft 83 is specific example of the rotating portion.

As shown in FIG. 1, the rotation sensing device 1 comprises a base 2, a magnet 3 serving as a magnetic field forming portion, three magnetic sensors 11 serving as the plurality of magnetic field sensing portions, three yokes 30, and two dummy yoke pieces 51, 52.

The base 2 is formed in a disk-like configuration and, as shown in FIG. 3, is secured to the housing of the motor main body 82 by means of a securing bracket 84. An insertion hole 2A is formed in the center of the base 2 and the rotary shaft 83 is inserted into the insertion hole 2A. The diameter of the insertion hole 2A is larger than the diameter of the rotary shaft 83 and the base 2 is spaced apart from the rotary shaft 83. In addition, the base 2 has a mounting face 2B, to which each magnetic sensor 11, each yoke 30, and each dummy yoke piece 51, 52 is mounted. The base 2 is arranged such that the mounting face 2B is parallel to a plane orthogonal to the rotational axis A of the rotary shaft 83. It should be noted that the mounting face 2B is a specific example of one face.

The magnet 3 is formed in an annular configuration from, for example, ferrite or another magnetic material. The magnet 3 has the rotary shaft 83 inserted internally of its periphery and is thus arranged on the outer periphery of the rotary shaft 83. The magnet 3 is secured to the rotary shaft 83 and rotates along with the rotary shaft 83. The center of the magnet 3, which is formed in an annular configuration, is positioned on the rotational axis A. In addition, the magnet 3 is positioned above the mounting face 2B of the base 2. In other words, the magnet 3 is secured to the section of the rotary shaft 83 that passes through the insertion hole 2A in the base 2 and protrudes above the mounting face 2B of the base 2.

In addition, as shown in FIG. 2, the magnet 3 is magnetized such that four magnetic poles, i.e., an N pole, an S pole, an N pole, and an S pole, are arranged in the outer peripheral section of the magnet 3 with equal angular spacing in the circumferential direction, more specifically, with 90-degree spacing. In addition, in the magnet 3, these four magnetic poles are arranged such that magnetic poles mutually adjacent in the circumferential direction are different from each other. When the magnet 3 rotates along with the rotary shaft 83, the four magnetic poles of the magnet 3 rotate and thereby form a rotating magnetic field around the rotational axis A.

The three magnetic sensors 11, all of which have an identical configuration and shape, are arranged on the outer periphery of the rotational trajectory K of the magnet 3 with equal angular spacing in the circumferential direction, for example, with 60-degree spacing. Each magnetic sensor 11 has a magnetic wire 12, as described hereinafter, and each magnetic sensor 11 is arranged such that the direction of extension of the magnetic wire 12 is a direction orthogonal to the rotational axis A (direction parallel to the mounting face 2B). In addition, as shown in FIG. 2, each magnetic sensor 11 is arranged such that the central portion of the magnetic wire 12 in the direction of extension is tangent to a circular arc C1 that is centered on the rotational axis A and has a radius larger than the radius of the rotational trajectory K of the magnet 3. In addition, the three magnetic sensors 11 are arranged on circular arc C1 within an angular range of 180 degrees, as a result of which the three magnetic sensors 11 are arranged within half the area of the mounting face 2B of the base 2. Each magnetic sensor 11 is secured on top of the mounting face 2B of the base 2. The three magnetic sensors 11 sense the rotating magnetic field formed by the magnet 3. Each magnetic sensor 11 will be further discussed later herein.

The three yokes 30, all of which have an identical configuration and shape, are arranged on the outer periphery of the rotational trajectory K of the magnet 3 in one-to-one correspondence with the three magnetic sensors 11. Each yoke 30 is secured on top of the mounting face 2B of the base 2. In addition, each yoke 30 comprises a left yoke piece 31 and a right yoke piece 41. Each yoke 30 controls the magnetic flux of the rotating magnetic field formed by the magnet 3. Each yoke 30 will be further discussed later herein. In addition, each dummy yoke piece 51 will be discussed later herein.

Further, an outer wall 55 is provided on the outer periphery of the base 2. The magnet 3, each magnetic sensor 11, each yoke 30, and each dummy yoke piece 51, 52 are arranged inwardly of the outer wall 55. The outer wall 55 is formed, for example, from a metallic material. The outer wall 55 is effective for preventing external objects from making contact with the magnet 3, each magnetic sensor 11, each yoke 30 or each dummy yoke piece 51, 52 and is effective for minimizing leakage of the magnetic field formed by the magnet 3 to outside.

(Magnetic Sensors)

Figure 4:
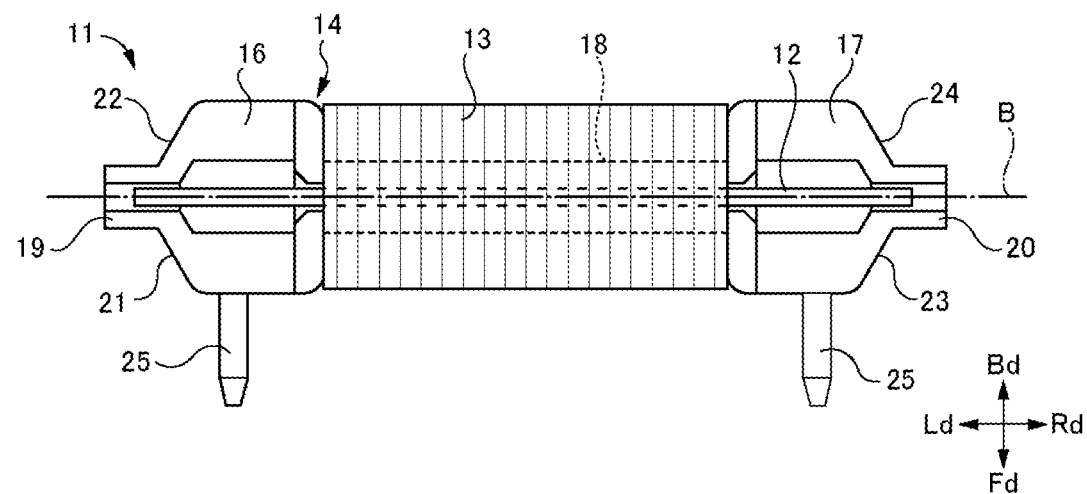
FIG. 4 is an illustrative diagram showing a magnetic sensor used in the rotation sensing device according to the embodiment of the present invention.
Figure 5:
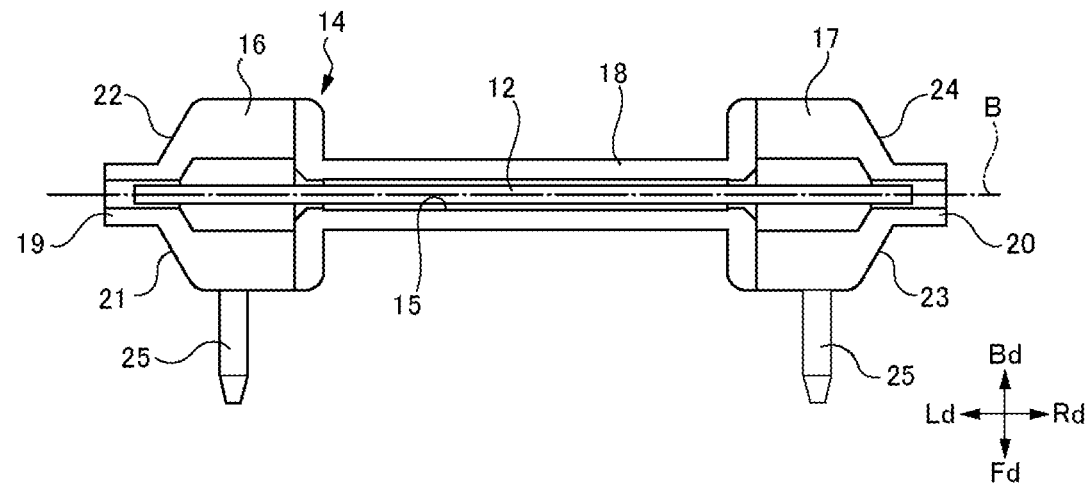
FIG. 5 is an illustrative diagram showing the magnetic sensor of FIG. 4 with its coil removed.

FIG. 4 shows a magnetic sensor 11, as viewed from above. FIG. 5 shows the magnetic sensor 11 of FIG. 4 with the coil 13 removed. Here, when each magnetic sensor 11 and each yoke 30 is described, for ease of discussion, directions are defined as follows. The direction of extension of the rotational axis A is the "up-down direction", and the direction in which the mounting face 2B of the base 2 is facing is "up". Further, the direction of extension of the magnetic wire 12 is the "left-right direction". In addition, the direction of extension of a straight line orthogonal to both the rotational axis A and the magnetic wire 12 is the "forward-backward direction", and the direction toward the rotational axis A in the forward-backward direction is "front". In addition, the left and right of the magnetic sensor 11 are defined based on a front view of the magnetic sensor 11 as a point of reference. In addition, the left and right of the yoke 30 are defined based on a front view of the yoke 30 as a point of reference. The arrows at the bottom right of FIGS. 4 through 14 illustrate the above definitions of "up" (Ud), "down" (Dd), "front" (Fd), "back" (Bd), "left" (Ld), and "right" (Rd).

As shown in FIG. 4, each magnetic sensor 11 comprises a magnetic wire 12, a coil 13 and a bobbin 14.

The magnetic wire 12, which is a magnetic wire that generates a large Barkhausen effect, is called a composite magnetic wire. The magnetic wire 12 is a wire that is formed, for example, from a semi-rigid magnetic material including iron and cobalt, and has a diameter of, e.g., approximately 0.1 mm to 1 mm and a length of, e.g., approximately 10 mm to 30 mm. The magnetic wire 12 is formed, for example, by drawing the semi-rigid magnetic material and twisting it multiple times while changing the direction. The magnetic wire 12 exhibits uniaxial anisotropy, in which the easy direction of magnetization is the direction of the central axis B of said magnetic wire 12. In addition, in the magnetic wire 12, its coercivity is larger in the central section than in the outer peripheral sections. The magnetic wire 12 has a property that the direction of magnetization of the magnetic wire 12 (its outer peripheral section) is suddenly reversed in response to changes in the direction of the external magnetic field. The magnetic wire 12 is arranged such that its direction of extension, i.e., the direction of its central axis B, is a direction parallel to the tangent to the rotational trajectory K of the magnet 3. Specifically, the magnetic wire 12 is arranged such that its central portion in the direction of extension is tangent to the circular arc C1.

The coil 13 is provided on the outer periphery of the magnetic wire 12. The coil 13 is formed by winding a conducting wire such as, for example, enameled wire on the conductor winding portion 18 of the bobbin 14.

The bobbin 14, which is a member that holds the magnetic wire 12 and coil 13 in place, is formed from a nonmagnetic material such as resin or the like. As shown in FIG. 5, when viewed as a whole, the bobbin 14 is formed in a columnar shape extending in the direction of extension of the magnetic wire 12, i.e., in the left-right direction. In addition, a wire receiving portion 15 that receives the magnetic wire 12 is formed inside the bobbin 14. In the present embodiment the wire receiving portion 15 is an upward-opening groove extending in the left-right direction from the left end to the right end of the bobbin 14 through the section of the bobbin 14 at the center in the forward-backward direction and at the center in the up-down direction. The magnetic wire 12 is arranged within this wire receiving portion 15. It should be noted that the wire receiving portion may be in the form of a hole passing through the inside of the bobbin 14 in the left-right direction.

In addition, connecting member retaining portions 16, 17, which hold connecting members 25 in place, are formed in the left end section and right end sections of the bobbin 14. Further, a conductor winding portion 18, on which the conductor wire of the coil 13 is wound, is formed on the outer periphery of the wire receiving portion 15, which is the central portion of the bobbin 14 in the left-right direction, i.e., the section between the two connecting member retaining portions 16, 17. The conductor winding portion 18 is made smaller in diameter than each connecting member retaining portion 16, 17 in order to make it possible to wind the conductor wire of the coil 13 in numerous layers.

In addition, a protruding portion 19 that protrudes to the left is formed in the central portion in the forward-backward direction on the left edge face of the bobbin 14, i.e., the left edge face of the left-side connecting member retaining portion 16. Similarly, a protruding portion 20 that protrudes to the right is formed in the central portion in the forward-backward direction on the right edge face of the bobbin 14, i.e., the right edge face of the right-side connecting member retaining portion 17. Further, the left end side of the wire receiving portion 15 extends to the left end of the left-side protruding portion 19 and the right end side of the wire receiving portion 15 extends to the right end of the right-side protruding portion 20. In addition, the left end side of the magnetic wire 12 extends to a location in very close proximity to the left end of the left-side protruding portion 19, and the right end side of the magnetic wire 12 extends to a location in very close proximity to the right end of the right-side protruding portion 20.

Further, inclined faces 21, 22 are formed respectively in the front and rear portions on the left edge face of the left-side connecting member retaining portion 16. The inclined face 21 formed in the front portion on the left edge face of the left-side connecting member retaining portion 16 is inclined such that the rear end of said inclined face 21 is located to the left of the front end of said inclined face 21. In addition, the inclined face 22 formed in the rear portion on the left edge face of the left-side connecting member retaining portion 16 is inclined such that the front end of said inclined face 22 is located to the left of the rear end of said inclined face 22. Further, inclined faces 23, 24 are formed symmetrically with respect to the inclined faces 21, 22 on the right edge face of the right-side connecting member retaining portion 17.

In addition, connecting members 25 are secured to each connecting member retaining portion 16, 17. The connecting members 25 are members formed in an L-shaped configuration from, for example, metal or another electrically conductive material, with one end thereof extending downward, and the other end extending forward. The connecting members 25 are effective for securing the magnetic sensor 11 to the base 2, connecting the coil 13 to circuits formed on the base 2, and attaching the end portion of the conductor wire of the coil 13.

When the magnet 3 rotates along with the rotary shaft 83 and a rotating magnetic field is formed by the magnet 3, the direction of magnetization of the magnetic wire 12 that each magnetic sensor 11 has is suddenly reversed by this rotating magnetic field and a pulse is output from the coil 13 by electromagnetic induction. In specific terms, in one magnetic sensor 11, when an N pole of the magnet 3 approaches the left end portion of said magnetic sensor 11 while an S pole of the magnet 3 approaches the right end portion of said magnetic sensor 11 in a state in which the direction of magnetization of the magnetic wire 12 is to the left, the direction of magnetization of the magnetic wire 12 is suddenly reversed from left to right and, for example, a positive pulse is output from the coil 13. Thereafter, when an S pole of the magnet 3 approaches the left end portion of said magnetic sensor 11 while an N pole of the magnet 3 approaches the right end portion of said magnetic sensor 11, the direction of magnetization of the magnetic wire 12 is suddenly reversed from right to left and, for example, a negative pulse is output from the coil 13. The rotation of the rotary shaft 83 can be sensed based on these pulses. The method described in Patent Document 1 above can be used as a method for sensing rotation with the help of such pulses.

(Yoke)

Figure 6:
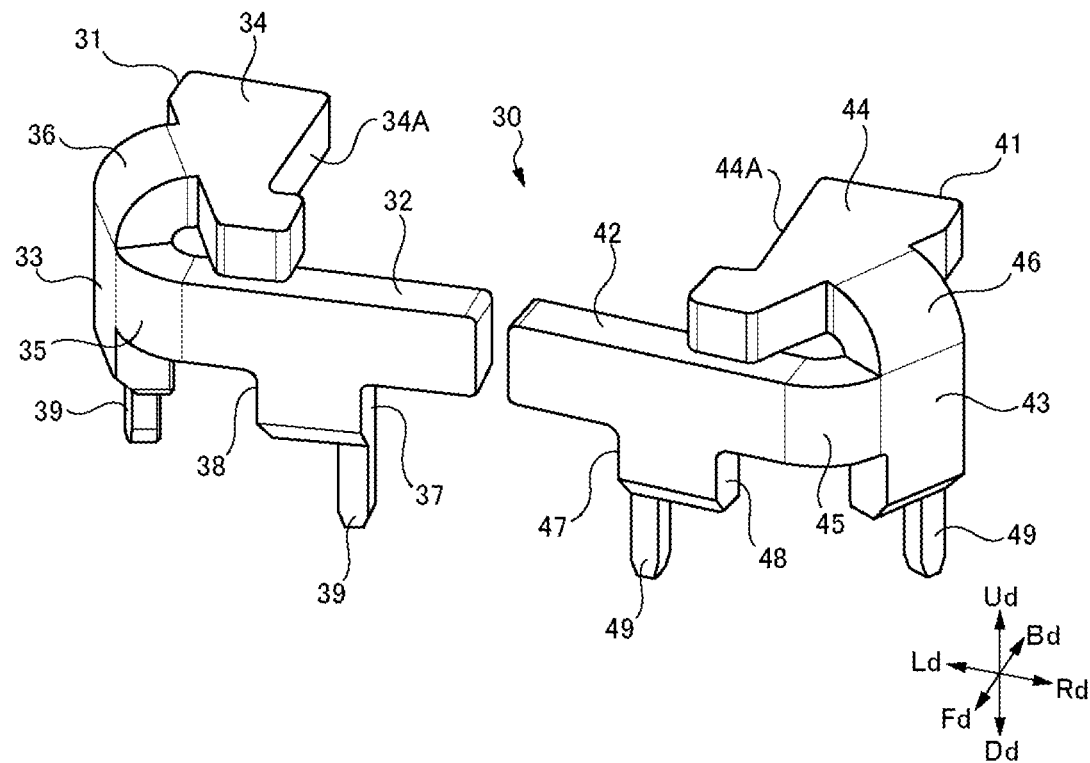
FIG. 6 is a perspective diagram showing a yoke used in the rotation sensing device according to the embodiment of the present invention.
Figure 7:
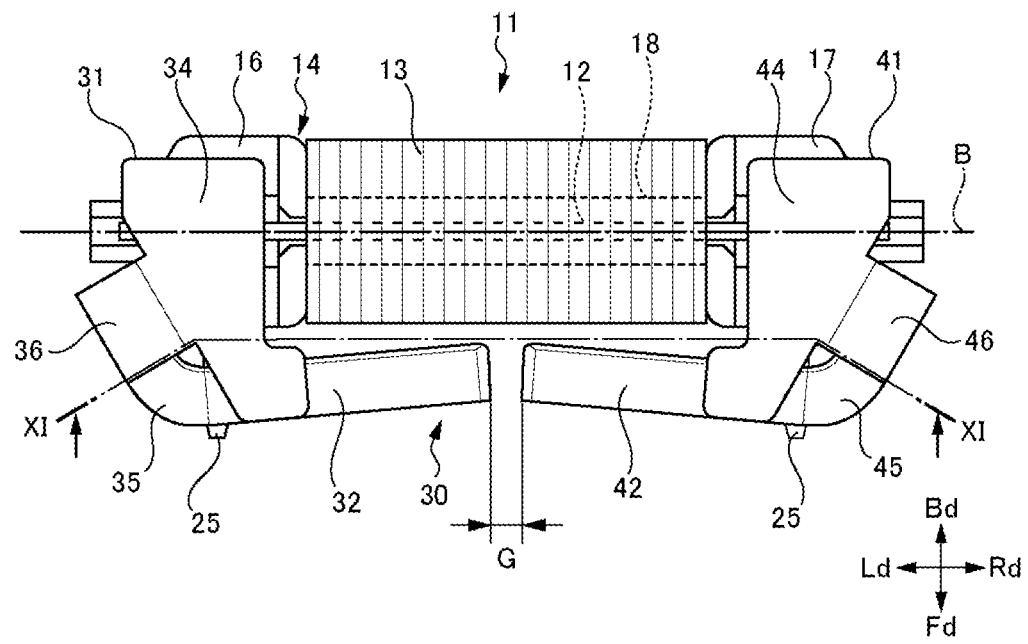
FIG. 7 is an illustrative diagram showing the magnetic sensor and yoke used in the rotation sensing device according to the embodiment of the present invention, as viewed from above.
Figure 8:
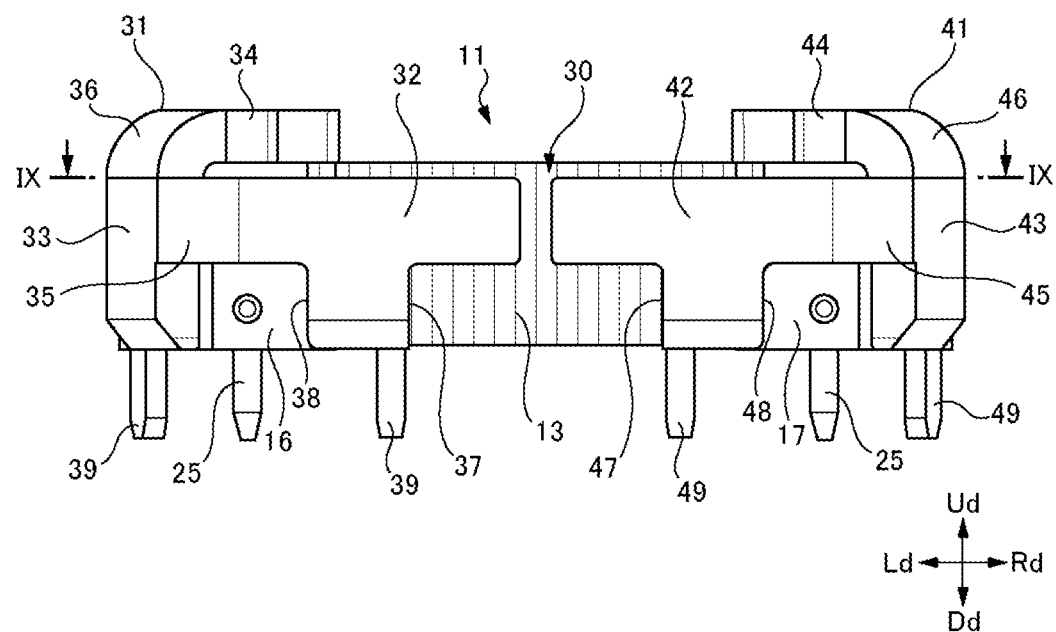
FIG. 8 is an illustrative diagram showing the magnetic sensor and yoke used in the rotation sensing device according to the embodiment of the present invention, as viewed from the front.

FIG. 6 shows a yoke 30 as viewed from the top right front. FIG. 7 shows a magnetic sensor 11 and a yoke 30 as viewed from above. FIG. 8 shows a magnetic sensor 11 and a yoke 30 as viewed from the front.

As shown in FIG. 6, each yoke 30 comprises a left yoke piece 31 and a right yoke piece 41. The left yoke piece 31 and right yoke piece 41 are each formed from a soft magnetic material such as iron or the like. The left yoke piece 31 and right yoke piece 41 are shaped to be symmetrical to each other. As shown in FIG. 7 and FIG. 8, the left yoke piece 31 partially covers the left portion of the magnetic sensor 11. The left yoke piece 31 has a left front plate portion 32, a left plate portion 33, a left upper plate portion 34, and coupling portions 35, 36. In addition, the right yoke piece 41 partially covers the right portion of the magnetic sensor 11. The right yoke piece 41 has a right front plate portion 42, a right plate portion 43, a right upper plate portion 44, and coupling portions 45, 46.

(Left Front Plate Portion & Right Front Plate Portion of Yokes)

Figure 9:
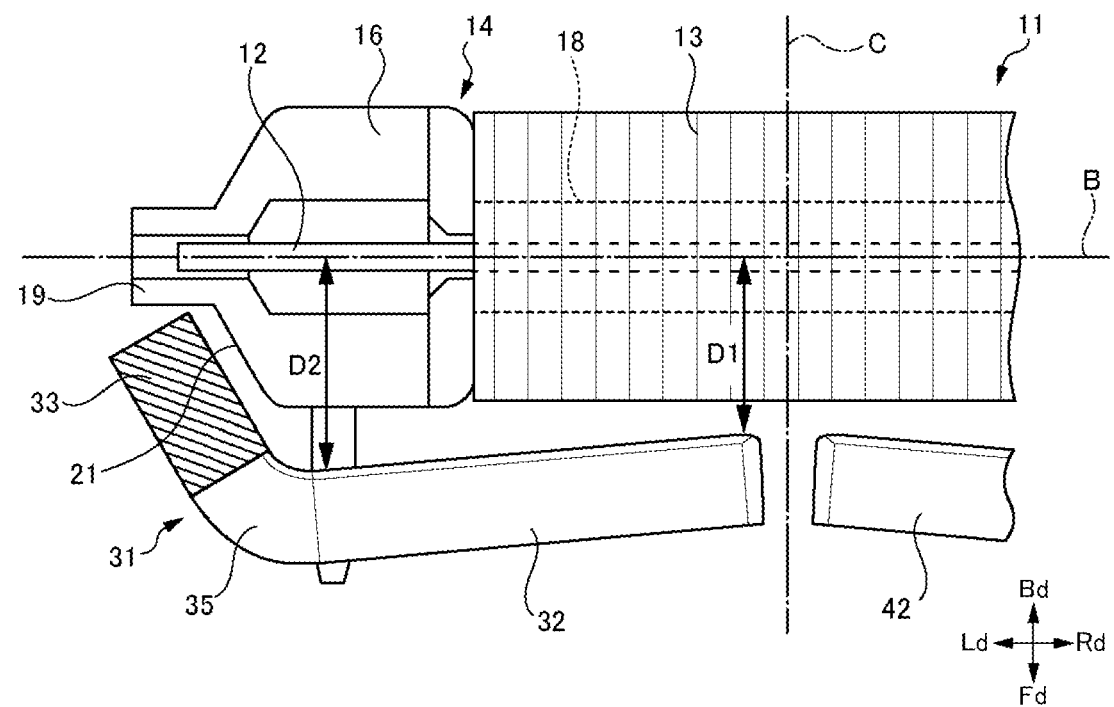
FIG. 9 is an illustrative diagram showing the left yoke piece and the left portion of the magnetic sensor used in the rotation sensing device according to the embodiment of the present invention, as viewed from above.
Figure 10:
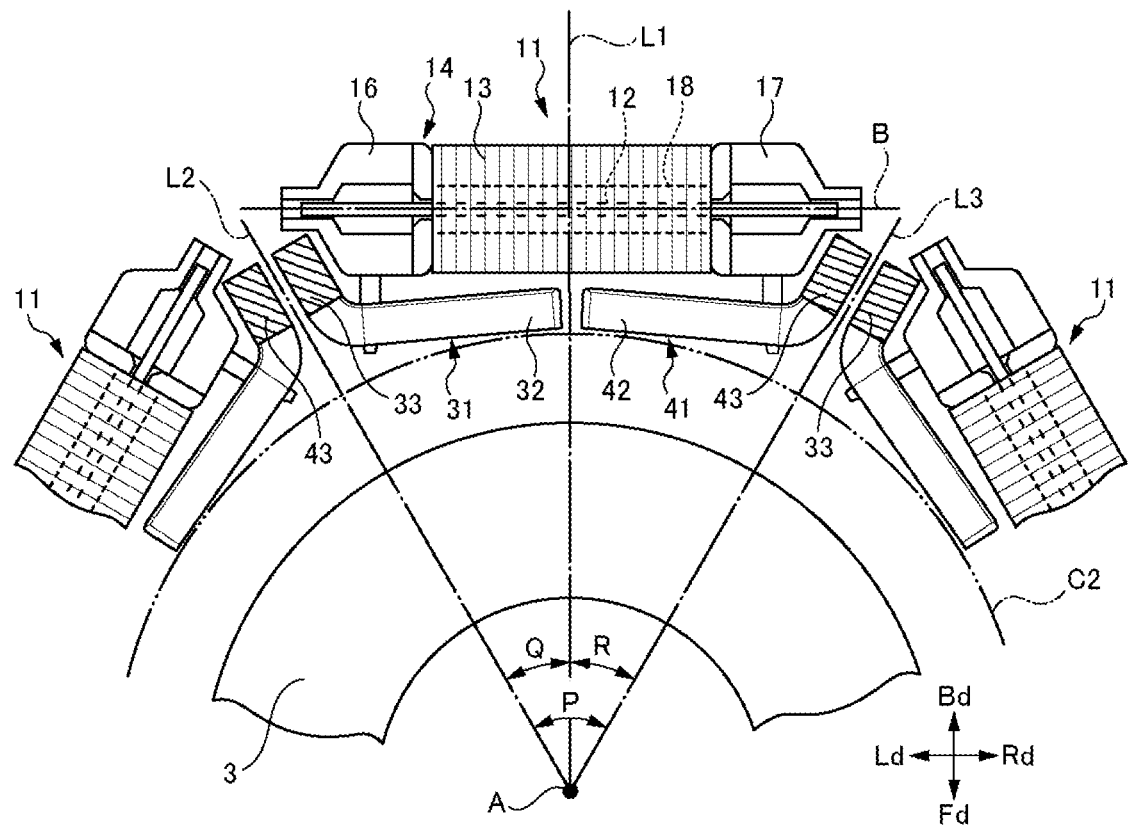
FIG. 10 is an illustrative diagram showing the magnet, magnetic sensors, and yokes, as viewed from above, provided to illustrate, in greater detail, the shape of the yokes used in the rotation sensing device according to the embodiment of the present invention.

FIG. 9 shows the left yoke piece 31 and the left portion of the magnetic sensor 11 as viewed from above. To describe the details of the shape of the left yoke piece 31 and right yoke piece 41, FIG. 10 shows the magnet 3, the magnetic sensor 11 and the yoke 30 as viewed from above. It should be noted that FIG. 9 and FIG. 10 show cross-sections of the left yoke piece 31 taken along section line IX-IX in FIG. 8, as viewed from above in FIG. 8. In addition, FIG. 10 also provides a partial cross-section of the right yoke piece 41, similarly to the left yoke piece 31.

As shown in FIG. 9, the left front plate portion 32 of the left yoke piece 31 covers the left-side connecting member retaining portion 16 of the bobbin 14 and the left portion of the coil 13 from the front. The left front plate portion 32 is formed in a planar configuration extending in a direction that is parallel to the mounting face 2B of the base 2, and is inclined with respect to the central axis B of the magnetic wire 12 (direction of extension of the magnetic wire 12) as well as in a direction perpendicular to the mounting face 2B of the base 2. In addition, the left front plate portion 32 extends linearly from the front of the left-side connecting member retaining portion 16 to the front of the left portion of the coil 13. In addition, the right end of the left front plate portion 32 reaches a location in very close proximity to the front of the center of the coil 13 in the left-right direction.

In addition, the left front plate portion 32 is inclined with respect to the central axis B of the magnetic wire 12 such that the right end of said left front plate portion 32 is located rearwardly of the left end of said left front plate portion 32. Due to the fact that the left front plate portion 32 is inclined in this manner, the distance D1 between the right end of the left front plate portion 32 and the central axis B of the magnetic wire 12 is smaller than the distance D2 between the left end of the left front plate portion 32 and the central axis B of the magnetic wire 12. In other words, the right end of the left front plate portion 32 is closer to the central axis B of the magnetic wire 12 than the left end of the left front plate portion 32. As a result, the left front plate portion 32 approaches the front outer surface of the coil 13 as one moves to the right.

In addition, the right front plate portion 42 of the right yoke piece 41 covers the right-side connecting member retaining portion 17 of the bobbin 14 and the right portion of the coil 13 from the front. The right front plate portion 42 is symmetrical in shape to the left front plate portion 32 of the left yoke piece 31. In other words, as can be appreciated by examining FIG. 10, the right front plate portion 42 is formed in a planar configuration extending in a direction that is parallel to the mounting face 2B of the base 2, and is inclined with respect to the central axis B of the magnetic wire 12 as well as in a direction perpendicular to the mounting face 2B of the base 2. In addition, the right front plate portion 42 extends linearly from the front of the right-side connecting member retaining portion 17 to the front of the right portion of the coil 13. In addition, the left end of the right front plate portion 42 reaches a location in very close proximity to the front of the center of the coil 13 in the left-right direction.

In addition, the right front plate portion 42 is inclined with respect to the central axis B of the magnetic wire 12 such that the left end of said right front plate portion 42 is located rearwardly of the right end of said right front plate portion 42. Due to the fact that the right front plate portion 42 is inclined in this manner, the left end of the right front plate portion 42 is closer to the central axis B of the magnetic wire 12 than the right end of the right front plate portion 42. As a result, the right front plate portion 42 approaches the front outer surface of the coil 13 as one moves to the left.

In addition, as shown in FIG. 10, the angle of inclination of the left front plate portion 32 of the left yoke piece 31 with respect to the central axis B of the magnetic wire 12 and the angle of inclination of the right front plate portion 42 of the right yoke piece 41 with respect to central axis B of the magnetic wire 12 are set such that the left front plate portion 32 and the right front plate portion 42 are generally in line with the circular arc C2 centered on the rotational axis A. As a result, the distance between the left end of the left front plate portion 32 and the outer peripheral surface of the magnet 3, the distance between the right end of the left front plate portion 32 and the outer peripheral surface of the magnet 3, the distance between the right end of the right front plate portion 42 and the outer peripheral surface of the magnet 3, and the distance between the left end of the right front plate portion 42 and the outer peripheral surface of the magnet 3 are equal to one another.

Further, as shown in FIG. 7, the right end of the left front plate portion 32 and the left end of the right front plate portion 42 are opposed across a gap G in front of the central portion of the coil 13 in the left-right direction. The right end of the left front plate portion 32 and the left end of the right front plate portion 42 are positioned in proximity to one another, but do not come into contact with each other.

(Left Plate Portion & Right Plate Portion of Yokes)

As shown in FIG. 9, the left plate portion 33 of the left yoke piece 31 covers the inclined face 21 of the front portion on the left edge face of the left-side connecting member retaining portion 16 of the bobbin 14 from the left. As shown in FIG. 10, the left plate portion 33 is formed in a planar configuration extending in a direction inclined with respect to straight line L1 orthogonal to both the rotational axis A and the central axis B of the magnetic wire 12, as well as in a direction perpendicular to the mounting face 2B of the base 2. In addition, the left plate portion 33 is inclined with respect to straight line L1 orthogonal to both the rotational axis A and the central axis B of the magnetic wire 12 such that the rear end of said left plate portion 33 is located to the left of the front end of said left plate portion 33. In addition, the angle of inclination Q of the left plate portion 33 with respect to straight line L1 is set to one-half the angular spacing P used in the arrangement of the three magnetic sensors 11. Since in the present embodiment the angular spacing P used in the arrangement of the three magnetic sensors 11 is 60 degrees, the angle of inclination Q of the left plate portion 33 with respect to straight line L1 is set to 30 degrees. In addition, the angle of inclination, with respect to the straight line L1, of the inclined face 21 of the front portion on the left edge face of the left-side connecting member retaining portion 16 of the bobbin 14 is also set to one-half the angular spacing P used in the arrangement of the three magnetic sensors 11 (30 degrees). As a result, the left plate portion 33 and said inclined face 21 are parallel to each other. It should be noted that straight line L2 in FIG. 10 is a straight line inclined 30 degrees to straight line L1 in the counterclockwise direction.

In addition, although the left plate portion 33, as shown in FIG. 9, covers the inclined face 21 of the front portion on the left edge face of the left-side connecting member retaining portion 16 of the bobbin 14, the protruding portion 19 and the inclined face 22 of the rear portion on the left edge face of the left-side connecting member retaining portion 16 are not covered. In other words, the rear end of the left plate portion 33 is located in front of the protruding portion 19.

Further, the right plate portion 43 of the right yoke piece 41 covers the inclined face 23 of the front portion on the right edge face of the right-side connecting member retaining portion 17 of the bobbin 14 from the right. The right plate portion 43 is symmetrical in shape to the left plate portion 33 of the left yoke piece 31. As shown in FIG. 10, the right plate portion 43 is formed in a planar configuration extending in a direction that is inclined with respect to straight line L1 as well as in a direction perpendicular to the mounting face 2B of the base 2. In addition, the right plate portion 43 is inclined with respect to straight line L1 such that the rear end of said right plate portion 43 is located to the right of the front end of said right plate portion 43. In addition, the angle of inclination R of the right plate portion 43 with respect to straight line L1 is set to one-half the angular spacing P used in the arrangement of the three magnetic sensors 11. In the present embodiment, the angle of inclination R of the right plate portion 43 with respect to straight line L1 is set to 30 degrees. In addition, the angle of inclination, with respect to the straight line L1, of the inclined face 23 of the front portion on the right edge face of the right-side connecting member retaining portion 17 of the bobbin 14 is also set to one-half the angular spacing P used in the arrangement of the three magnetic sensors 11 (30 degrees). As a result, the right plate portion 43 and said inclined face 23 are parallel to each other. It should be noted that straight line L3 in FIG. 10 is a straight line inclined 30 degrees to straight line L1 in the clockwise direction.

In addition, although the right plate portion 43 covers the inclined face 23 of the front portion on the right edge face of the right-side connecting member retaining portion 17 of the bobbin 14, the protruding portion 20 and the inclined face 24 of the rear portion on the right edge face of the right-side connecting member retaining portion 17 are not covered. In other words, the rear end of the right plate portion 43 is located in front of the protruding portion 20.

(Left Upper Plate Portion & Right Upper Plate Portion of Yokes)

Figure 11:
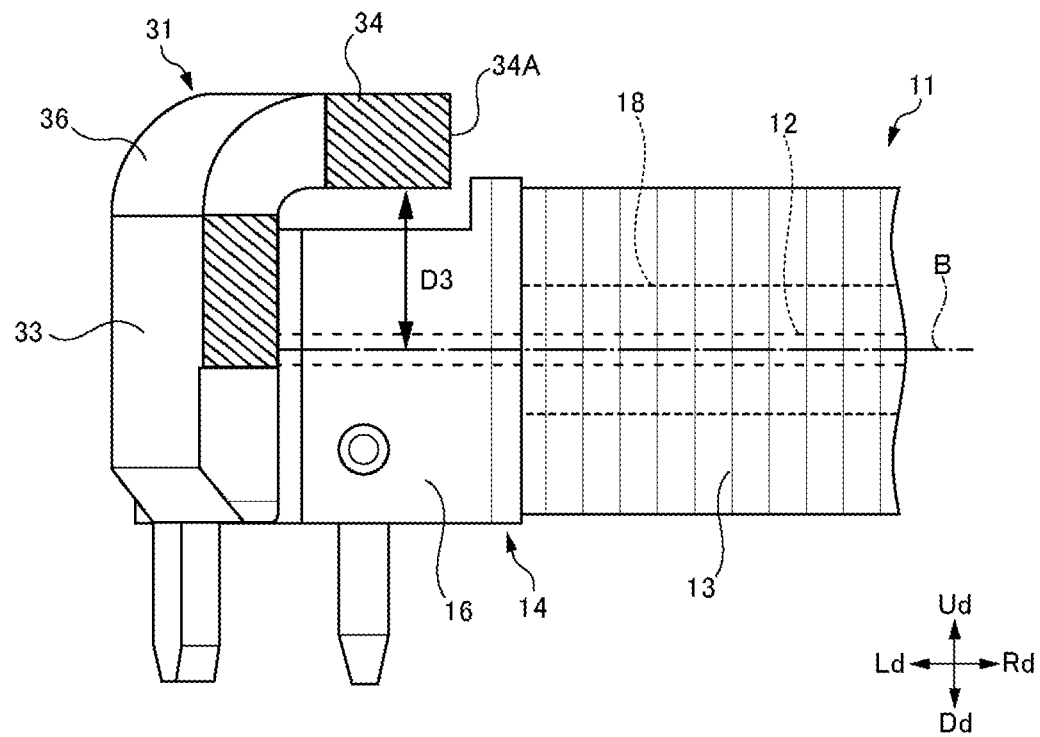
FIG. 11 is an illustrative diagram showing the left yoke piece and the left portion of the magnetic sensor used in the rotation sensing device according to the embodiment of the present invention, as viewed from the front.
Figure 12:
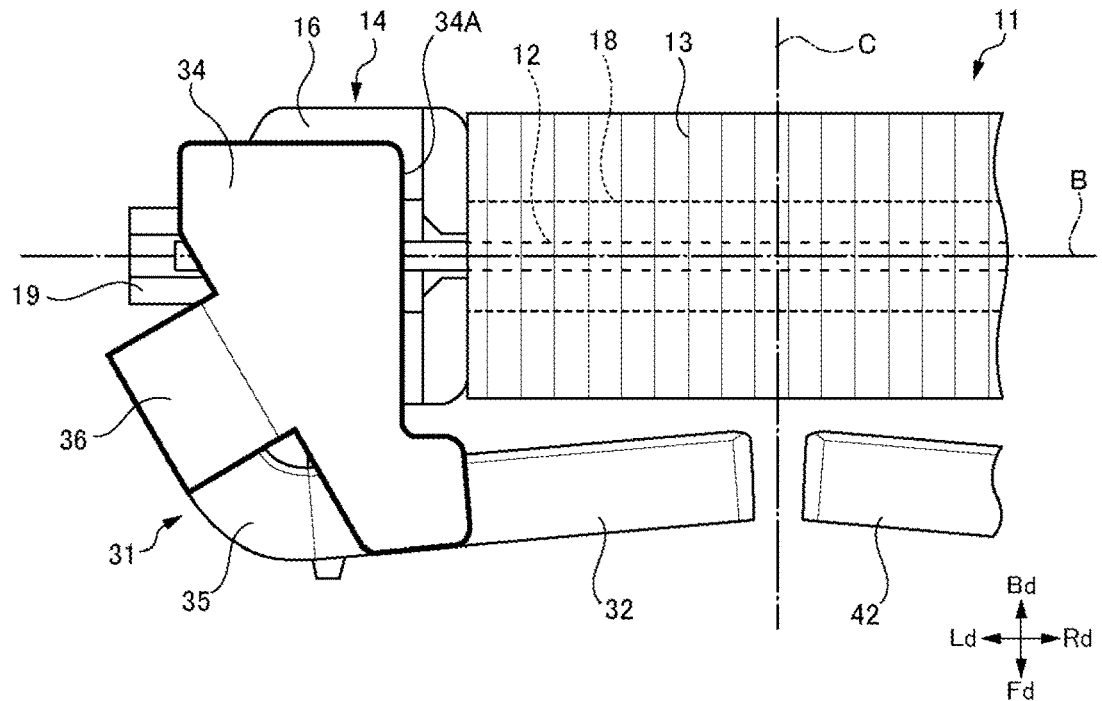
FIG. 12 is an illustrative diagram showing the left yoke piece and the left portion of the magnetic sensor used in the rotation sensing device according to the embodiment of the present invention, as viewed from above.

FIG. 11 shows the left yoke piece 31 and the left portion of the magnetic sensor 11, as viewed from the front. It should be noted that FIG. 11 shows a cross-section of the left yoke piece 31 taken along section line XI-XI in FIG. 7, as viewed from below in FIG. 11. FIG. 12 shows the left yoke piece 31 and the left portion of the magnetic sensor 11 as viewed from above.

As shown in FIG. 11 and FIG. 12, the left upper plate portion 34 of the left yoke piece 31 covers the left-side connecting member retaining portion 16 of the bobbin 14 from the above. The left upper plate portion 34 is formed in a planar configuration extending in a direction parallel to the mounting face 2B of the base 2. In addition, the left upper plate portion 34 largely covers the section of the magnetic wire 12 protruding to the left from the coil 13. Specifically, the left upper plate portion 34 spans across said section of the magnetic wire 12 in the forward-backward direction.

In this manner, while the left upper plate portion 34 largely covers the left-side connecting member retaining portion 16 of the bobbin 14 from above, the range covered by the left upper plate portion 34 remains above the left-side connecting member holding portion 16 and does not extend to above the coil 13. In other words, the left upper plate portion 34 does not enter the region above the coil 13. The coil 13 is not covered by the yoke 30 from above.

In addition, as shown in FIG. 11, the left upper plate portion 34 is disposed very close to the top face of the left-side connecting member retaining portion 16 of the bobbin 14 such that the distance D3 between said left upper plate portion 34 and the magnetic wire 12 is reduced. Specifically, the position of the bottom face of the left upper plate portion 34 in the up-down direction is at or below the position of the uppermost portion of the outer surface of the coil 13 in the up-down direction.

In addition, as shown in FIG. 12, the right face 34A of the left upper plate portion 34 is perpendicular to the central axis B of the magnetic wire 12 and extends above the magnetic wire 12 in the forward-backward direction.

In addition, the right upper plate portion 44 of the right yoke piece 41 covers the right-side connecting member retaining portion 17 of the bobbin 14 from above. The right upper plate portion 44 is symmetrical in shape to the left upper plate portion 34 of the left yoke piece 31. The right upper plate portion 44 is formed in a planar configuration extending in a direction parallel to the mounting face 2B of the base 2 and largely covers the section of the magnetic wire 12 protruding to the right from the coil 13. However, the range covered by the right upper plate portion 44 remains above the right-side connecting member retaining portion 17 and does not extend to above the coil 13. In addition, the position of the right upper plate portion 44 in the up-down direction is set such that the distance between the right upper plate portion 44 and the magnetic wire 12 is reduced. Specifically, the position of the bottom face of the right upper plate portion 44 in the up-down direction is at or below the position of the uppermost portion of the outer surface of the coil 13 in the up-down direction. Furthermore, the left face 44A of the right upper plate portion 44 is perpendicular to the central axis B of the magnetic wire 12 and extends above the magnetic wire 12 in the forward-backward direction.

(Other Yoke Configurations)

As shown in FIG. 6, in the left yoke piece 31, the coupling portion 35 couples the left front plate portion 32 and the left plate portion 33. Further, the coupling portion 36 couples the left plate portion 33 and the left upper plate portion 34. In addition, in the right yoke piece 41, the coupling portion 45 couples the right front plate portion 42 and the right plate portion 43. In addition, the coupling portion 46 couples the right plate portion 43 and the right upper plate portion 44. Each coupling portion 35, 36, 45, 46 is formed in a gently curved rounded shape.

In addition, as shown in FIG. 8, in the left yoke piece 31, a notch 37 used for adjusting the strength of the magnetic field acting on the magnetic wire 12 is formed at the bottom of the right end side of the left front plate portion 32. Further, a notch 38 used for passing a connecting member 25 therethrough is formed at the bottom of the section extending from the left end of the left front plate portion 32 to the coupling portion 35. In a similar manner, notches 47, 48 are also formed in the right yoke piece 41.

In addition, as shown in FIG. 6, in the left yoke piece 31, support pieces 39 used for securing the left yoke piece 31 to the base 2 are provided at the bottom of the left front plate portion 32 and at the bottom of the left plate portion 33. In a similar manner, support pieces 49 are also provided in the right yoke piece 41. The left yoke piece 31 and right yoke piece 41 are secured to the base 2 by inserting each support piece 39, 49 into apertures formed in the base 2 and, for example, soldering them in place.

(Magnetic Action of Yokes)

Figure 13:
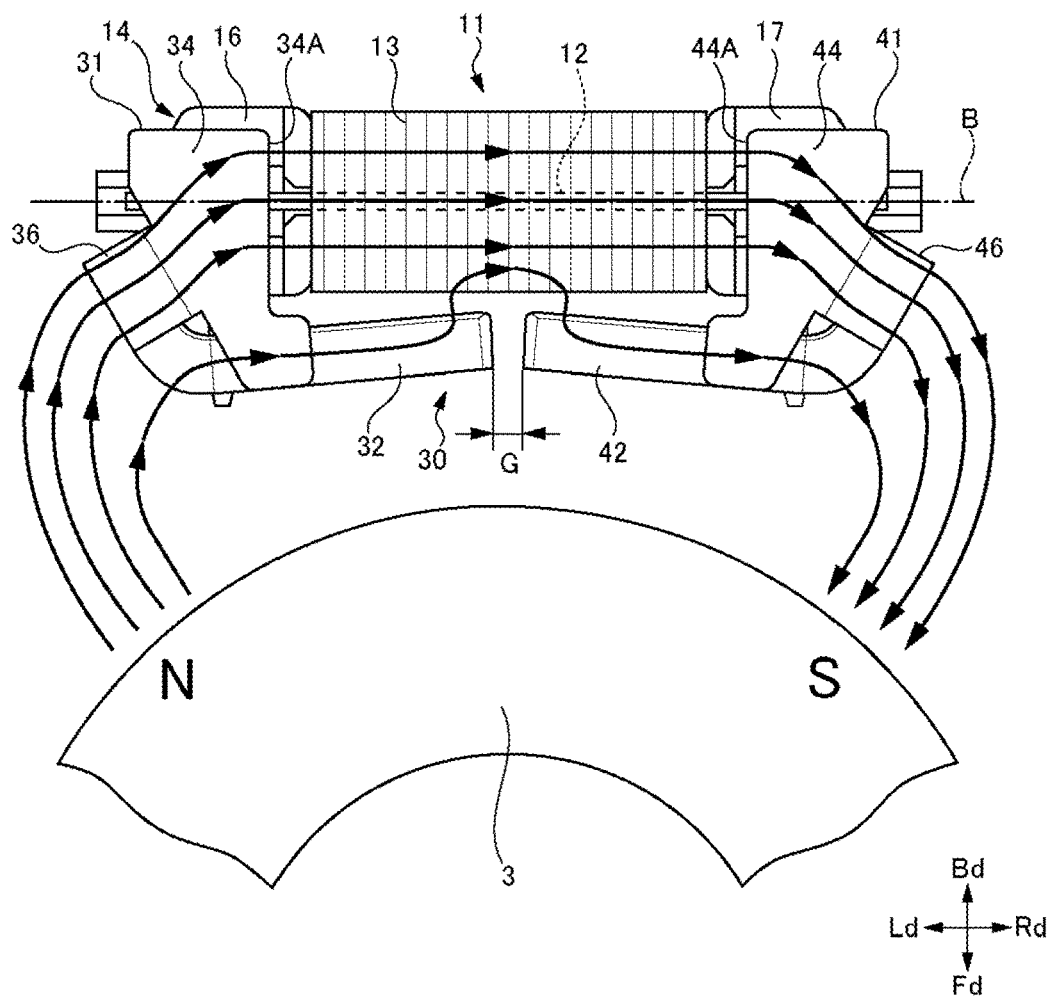
FIG. 13 is an illustrative diagram showing the flow of magnetic flux controlled by the yokes in the rotation sensing device according to the embodiment of the present invention.
Figure 14:
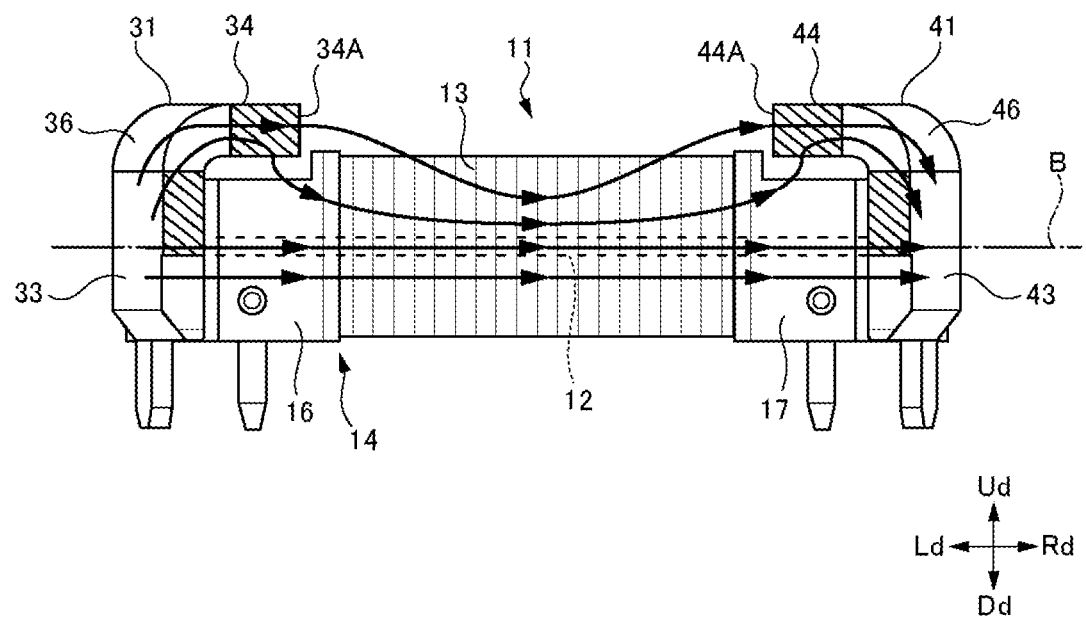
FIG. 14 is an illustrative diagram showing the flow of magnetic flux controlled by the left upper plate portion and left plate portion of the left yoke piece as well as the right upper plate portion and right plate portion of the right yoke piece in the rotation sensing device according to the embodiment of the present invention.

FIG. 13 diagrammatically illustrates the flow of the magnetic flux controlled by the yokes 30. FIG. 14 diagrammatically illustrates the flow of the magnetic flux controlled by the left plate portion 33 and left upper plate portion 34 of the left yoke piece 31 as well as the right plate portion 43 and right upper plate portion 44 of the right yoke piece 41.

When the magnet 3 rotates along with the rotary shaft 83, an N pole of the magnet 3 approaches the left end portion of one magnetic sensor 11 while an S pole of the magnet 3 approaches the right end portion of said magnetic sensor 11, and said magnetic sensor 11 is thereby placed in the magnetic field formed by the N poles and S poles of the magnet 3. At such time, as shown in FIG. 13 and FIG. 14, the path of the magnetic flux from the N poles to the S poles of the magnet 3 is controlled by the yoke 30 partially covering said magnetic sensor 11. This makes it possible to focus the magnetic flux on the magnetic wire 12 of said magnetic sensor 11.

To consider this in more detail, the left front plate portion 32 extends from the front of the left-side connecting member retaining portion 16 of the bobbin 14 to a location in very close proximity to the front of the center of the coil 13 in the left-right direction and, in addition, the right front plate portion 42 extends from the front of the right-side connecting member retaining portion 17 of the bobbin 14 to a location in very close proximity to the front of the center of the coil 13 in the left-right direction, and the right end of the left front plate portion 32 and the left end of the right front plate portion 42 are mutually opposed across a small gap G. This configuration makes it possible to focus the magnetic flux on the central portion of the magnetic wire 12 in the left-right direction.

In addition, the left front plate portion 32 is inclined with respect to the central axis B of the magnetic wire 12 such that the right end of said left front plate portion 32 is located rearwardly of the left end of said left front plate portion 32, as a result of which the left front plate portion 32 approaches the central portion of the magnetic wire 12 in the left-right direction as one moves to the right. In a similar manner, the right front plate portion 42 is inclined with respect to the central axis B of the magnetic wire 12 such that the left end of said right front plate portion 42 is located rearwardly of the right end of said right front plate portion 42, as a result of which the right front plate portion 42 approaches the central portion of the magnetic wire 12 in the left-right direction as one moves to the left. This configuration makes it possible to increase the degree to which magnetic flux is focused on the central portion of the magnetic wire 12 in the left-right direction.

In addition, the right face 34A of the left upper plate portion 34 and the left face 44A of the right upper plate portion 44 are perpendicular to the central axis B of the magnetic wire 12 and extend above the magnetic wire 12 in the forward-backward direction. The magnetic flux has the property of exiting the faces of the yoke in a direction perpendicular to said faces as well as the property of entering the faces of the yoke in a direction perpendicular to said faces. Therefore, some of the magnetic flux in the magnetic field formed by the magnet 3 exits the right face 34A of the left upper plate portion 34 in a direction perpendicular to said right face 34A and enters the left face 44A of the right upper plate portion 44 in a direction perpendicular to said left face 44A. This makes it possible to increase the magnetic flux flowing along the direction of the central axis B of the magnetic wire 12. Furthermore, since the right face 34A of the left upper plate portion 34 and the left face 44A of the right upper plate portion 44 extend above the magnetic wire 12 in the forward-backward direction, the magnetic flux flowing along the direction of the central axis B of the magnetic wire 12 can be further increased.

In addition, since the left plate portion 33 is in the vicinity of the left end portion of the magnetic wire 12 and the right plate portion 43 is in the vicinity of the right end side of the magnetic wire 12, the magnetic flux is collected by the left plate portion 33, and the magnetic flux toward the right plate portion 43 can be focused on the magnetic wire 12 and the magnetic flux flowing along the direction of the central axis B of the magnetic wire 12 can be increased.

It should be noted that when the magnet 3 rotates along with the rotary shaft 83, an S pole of the magnet 3 approaches the left end portion of said magnetic sensor 11 while an N pole of the magnet 3 approaches the right end portion of said magnetic sensor 11, and said magnetic sensor 11 is thereby placed in a magnetic field reversed in direction from when an N pole of the magnet 3 approaches the left end portion of said magnetic sensor 11 and an S pole of the magnet 3 approaches the right end portion of the magnetic sensor 11. In such a case, the direction of the flow of the magnetic flux along the path illustrated in FIG. 13 and FIG. 14 is reversed.

In this manner, the magnetic flux of the magnetic field formed by the magnet 3 is focused on the magnetic wire 12 by the yoke 30, and the magnetic flux is caused to flow along the direction of the central axis B of the magnetic wire 12, thereby making it possible to increase the strength of the magnetic field acting on the magnetic wire 12. As a result, due to the reversal of the direction of magnetization of the magnetic wire 12, the height (voltage) of the pulse output from the coil 13 can be increased and, in addition, the pulse can be made sharper. Therefore, the accuracy in sensing the rotation of the rotary shaft 83 can be improved.

In addition, focusing the magnetic flux of the magnetic field formed by the magnet 3 on the central portion of the magnetic wire 12 in the left-right direction with the help of the left front plate portion 32 and right front plate portion 42 of the yoke 30 makes it possible to increase the strength of the magnetic field acting on the central portion of the magnetic wire 12 in the left-right direction. This makes it possible to equalize the strength of the magnetic field acting on both end sections of the magnetic wire 12 and the strength of the magnetic field acting on the central section of the magnetic wire 12 in the left-right direction. As a result, due to the reversal of the direction of magnetization of the magnetic wire 12, the height of the pulse output from the coil 13 can be further increased, and, in addition, the pulse can be made even sharper. Therefore, the accuracy in sensing the rotation of the rotary shaft 83 can be further improved.

(Dummy Yoke Pieces)

As shown in FIG. 2, when the mounting face 2B of the base 2 is viewed from above, one dummy yoke piece 51 of the two dummy yoke pieces 51, 52 has the same configuration and shape as the left yoke piece 31 of the yoke 30. Dummy yoke piece 51 is arranged on the clockwise side of the magnetic sensor 11 arranged on the most clockwise side among the three magnetic sensors 11. Further, another dummy yoke piece 52 has the same configuration and shape as the right yoke piece 41 of the yoke 30. The dummy yoke piece 52 is arranged on the counterclockwise side of the magnetic sensor 11 arranged on the most counterclockwise side among the three magnetic sensors 11. In addition, there are neither magnetic sensors corresponding to the dummy yoke piece 51 nor magnetic sensors corresponding to the dummy yoke piece 52 on the mounting face 2B of the base 2.

To illustrate this in greater detail, the three magnetic sensors 11 are arranged on the mounting face 2B of the base 2 at 60-degree spacing on the circular arc C1 centered on the rotational axis A. Further, as can be appreciated by examining FIG. 2, the three yokes 30 corresponding to the three magnetic sensors 11 on a one-to-one basis are arranged at 60-degree spacing on the circular arc C1 on the mounting face 2B of the base 2. In addition, since the spacing at which the left yoke piece 31 and the right yoke piece 41 are arranged in each yoke 30 is the same in all three yokes 30, the three left yoke pieces 41 disposed on the mounting face 2B of the base 2 are arranged on the circular arc C1 at 60-degree spacing and, in addition, the three right yoke pieces 41 disposed on the mounting face 2B of the base 2 are arranged on the circular arc C1 at 60-degree spacing.

The dummy yoke piece 51, which has the same configuration and shape as the left yoke piece 31, is arranged on the circular arc C1 on the mounting face 2B of the base 2 and is arranged on the clockwise side of the left yoke piece 31 arranged on the most clockwise side among the three left yoke pieces 31 while being spaced 60 degrees from said left yoke piece 31. In other words, the three left yoke pieces 31 and the dummy yoke piece 51 are arranged on the same circular arc C1 with equal angular spacing.

In addition, the dummy yoke piece 52, which has the same configuration and shape as the right yoke piece 41, is arranged on the circular arc C1 on the mounting face 2B of the base 2 and is arranged on the counterclockwise side of the right yoke piece 41 arranged on the most counterclockwise side among the three right yoke pieces 41 while being spaced 60 degrees from said right yoke piece 41. In other words, the three right yoke pieces 41 and the dummy yoke piece 52 are arranged on the same circular arc C1 with equal angular spacing.

In this manner, as a result of arranging the dummy yoke pieces 51, 52 on the mounting face 2B, the left yoke piece 31 of the intermediate yoke 30 and the right yoke piece 41 of the yoke 30 on the most counterclockwise side are disposed adjacent each other on the counterclockwise side of the intermediate magnetic sensor 11 among the three magnetic sensors 11, and the right yoke piece 41 of the intermediate yoke 30 and the left yoke piece 31 of the yoke 30 on the most clockwise side are disposed adjacent each other on the clockwise side of this intermediate magnetic sensor 11. In addition, the left yoke piece 31 of the yoke 30 on the most clockwise side and the right yoke piece 41 of the intermediate yoke 30 are disposed adjacent each other on the counterclockwise side of the magnetic sensor 11 on the most clockwise side among the three magnetic sensors 11, and the right yoke piece 41 of the yoke 30 on the most clockwise side and the dummy yoke piece 51 are disposed adjacent each other on the clockwise side of the magnetic sensor 11 on the most counterclockwise side. Further, the left yoke piece 31 of the yoke 30 on the most counterclockwise side and the dummy yoke piece 52 are disposed adjacent each other on the counterclockwise side of the magnetic sensor 11 on the most counterclockwise side among the three magnetic sensors 11, and the right yoke piece 41 of the yoke 30 on the most counterclockwise side and the left yoke piece 31 of the intermediate yoke 30 are disposed adjacent each other on the clockwise side of the magnetic sensor 11 on the most counterclockwise side. As a result of the above, the configuration of the yoke pieces arranged around each magnetic sensor 11 is identical for all three magnetic sensors 11. Therefore, the magnetic circuits formed by the yoke pieces around each magnetic sensor 11 are identical for all three magnetic sensors 11. This makes it possible to equalize the strength of the rotating magnetic field acting on the magnetic wire 12 of each magnetic sensor 11 among the three magnetic sensors 11 when the three magnetic sensors 11 are placed in a rotating magnetic field. Therefore, the accuracy in sensing the rotation of the rotary shaft 83 can be improved.

As described above, in the rotation sensing device 1 according to the embodiment of the present invention, the left yoke piece 31 of each yoke 30 has a left front plate portion 32, and the left front plate portion 32 extends linearly from the front of the left-side connecting member retaining portion 16 of the bobbin 14 to the front of the left portion of the coil 13 while also being inclined with respect to the central axis B of the magnetic wire 12 such that the right end of said left front plate portion 32 is located rearwardly of the left end of said left front plate portion 32. In addition, the right yoke piece 41 of each yoke 30 has a right front plate portion 42, and the right front plate portion 42 extends linearly from the front of the right-side connecting member retaining portion 17 of the bobbin 14 to the front of the right portion of the coil 13 while also being inclined with respect to the central axis B of the magnetic wire 12 such that the left end of said right front plate portion 42 is located rearwardly of the right end of said right front plate portion 42. With this configuration, as described above, when the N poles and S poles of the magnet 3 approach the magnetic sensor 11, for example, as shown in FIG. 13, the magnetic flux of the magnetic field formed by the magnet 3 can be focused on the central portion of the magnetic wire 12 of each magnetic sensor 11 in the left-right direction, and the accuracy in sensing the rotation of the rotary shaft 83 can be improved.

In addition, as shown in FIG. 10, with this configuration, the left front plate portion 32 and right front plate portion 42 can be arranged so as to be generally in line with circular arc C2 centered on rotational axis A. For this reason, the distance between the left end of the left front plate portion 32 and the outer peripheral surface of the magnet 3, the distance between the right end of the left front plate portion 32 and the outer peripheral surface of the magnet 3, the distance between the right end of the right front plate portion 42 and the outer peripheral surface of the magnet 3, and the distance between the left end of the right front plate portion 42 and the outer peripheral surface of the magnet 3 can be made equal to one another. As a result, by shortening the spacing between the magnet 3 and each magnetic sensor 11, the rotation sensing device 1 can be made more compact and false detection of rotation of the rotary shaft 83 can be minimized. In specific terms, if the left front plate portion 32 were to extend in parallel to the central axis B of the magnetic wire 12, the distance between the right end of the left front plate portion 32 and the outer peripheral surface of the magnet 3 would be smaller than the distance between the left end of the left front plate portion 32 and the outer peripheral surface of the magnet 3. In this case, for example, not only when an N pole of the magnet 3 approaches the left end of the left front plate portion 32 (i.e., when an N pole of the magnet 3 approaches the left end portion of the magnetic sensor 11), but also when an N pole of the magnet 3 approaches the right end of the left front plate portion 32 (i.e., when an N pole of the magnet 3 approaches the vicinity of the center of the magnetic sensor 11 in the left-right direction), some of the magnetic flux in the magnetic field formed by the magnet 3 is controlled by the left front plate portion 32 of the left yoke piece 31 and ends up being focused on the magnetic wire 12 of the magnetic sensor 11. In such a case, the direction of magnetization of the magnetic wire 12 of said magnetic sensor 11 is reversed not when the N pole of the magnet 3 approaches the left end portion of the magnetic sensor 11, but when the N pole of the magnet 3 approaches the vicinity of the center of the magnetic sensor 11 in the left-right direction, and consequently a pulse is output from the coil 13 in a mistimed manner. Phenomena wherein pulses are output this way in a mistimed manner are likely to occur if the spacing between the magnet 3 and the magnetic sensor 11 is small. In the present embodiment, due to the fact that the left front plate portion 32 is inclined with respect to the central axis B of the magnetic wire 12 such that the right end of said left front plate portion 32 is located rearwardly of the left end of said left front plate portion 32, phenomena wherein pulses are output in a mistimed manner can be minimized even if the spacing between the magnet 3 and the magnetic sensor 11 is shortened. The same applies to the right front plate portion 42.

In addition, in the rotation sensing device 1 according to the embodiment of the present invention, the left yoke piece 31 of each yoke 30 has a left plate portion 33, and the left plate portion 33 is inclined with respect to straight line L1 orthogonal to both the rotational axis A and the central axis B of the magnetic wire 12 such that the rear end of said left plate portion 33 is located to the left of the front end of said left plate portion 33. Further, the right yoke piece 41 of each yoke 30 has a right plate portion 43, and the right plate portion 43 is inclined with respect to straight line L1 such that the rear end of said right plate portion 43 is located to the right of the front end of said right plate portion 43. This configuration makes it possible to extend the length of the magnetic wire 12 of each magnetic sensor 11. In specific terms, inclining the left plate portion 33 with respect to straight line L1 such that the rear end of said left plate portion 33 is located to the left of the front end of said left plate portion 33 makes it possible to separate the rear end of the left plate portion 33 from the left end of the bobbin 14. Since a space appears between the rear end side of the left plate portion 33 and the left end of the bobbin 14 as a result, a protruding portion 19 can be provided at the left end of the bobbin 14 and the left end side of the wire receiving portion 15 can be extended to the protruding portion 19. In a similar manner, since inclining the right plate portion 43 with respect to straight line L1 such that the rear end of said right plate portion 43 is located to the right of the front end of said right plate portion 43 makes it possible to separate the rear end side of the right plate portion 43 from the right end of the bobbin 14, a protruding portion 20 can be provided at the right end of the bobbin 14 and the right end side of the wire receiving portion 15 can be extended to the protruding portion 20. Extending both ends of the wire receiving portion 15 in this manner makes it possible to extend the length of the wire receiving portion 15 and makes it possible to extend the maximum length of the magnetic wire 12 that can be received within the wire receiving portion 15.

Further, in the rotation sensing device 1 according to the embodiment of the present invention, the angle of inclination Q of the left plate portion 33 with respect to straight line L1 is set to one-half the angular spacing P used in the arrangement of the three magnetic sensors 11 and, in addition, the angle of inclination R of the right plate portion 43 with respect to straight line L1 is set to one-half the angular spacing P used in the arrangement of the three magnetic sensors 11. With this configuration, even if the length of the magnetic wire 12 of each magnetic sensor 11 is extended, the spacing between two magnetic sensors 11 adjacent to each other can be shortened and the rotation sensing device 1 can be made more compact. In specific terms, as shown in FIG. 10, as a result of setting angle of inclination Q and angle of inclination R respectively to one-half the angular spacing P, in two yokes 30 adjacent to each other in the circumferential direction, the right plate portion 43 of the right yoke piece 41 of the yoke 30 on the counterclockwise side and the left plate portion 33 of the left yoke piece 31 of the yoke 30 on the clockwise side can be made parallel to each other. By making the mutually adjacent right plate portion 43 and left plate portion 33 parallel to each other in this manner, the spacing between the right plate portion 43 and the left plate portion 33 can be shortened, and the spacing between two magnetic sensors 11 adjacent to each other can also be shortened. In other words, even though the maximum length of the magnetic wire 12 that can be received within the wire receiving portion 15 is extended by inclining the right plate portion 43 and the left plate portion 33, respectively, with respect to straight line L1, placing the mutually adjacent right plate portion 43 and left plate portion 33 parallel to each other makes it possible to shorten the spacing between two magnetic sensors 11 adjacent to each other.

In addition, in the rotation sensing device 1 according to the embodiment of the present invention, an inclined face 21 is formed in the front portion on the left edge face of the left-side connecting member retaining portion 16 of the bobbin 14, and the angle of inclination of this inclined face 21 with respect to the straight line L1 is set to one-half the angular spacing P used in the arrangement of the three magnetic sensors 11. This makes it possible to make the left plate portion 33 of the left yoke piece 31 parallel to the front portion on the left edge face of the left-side connecting member retaining portion 16 of the bobbin 14 and reduce the distance between the left plate portion 33 and the front portion on the left edge face of the left-side connecting member retaining portion 16 of the bobbin 14. In addition, an inclined face 23 is formed in the front portion on the right edge face of the right-side connecting member retaining portion 17 of the bobbin 14, and the angle of inclination of the inclined face 23 with respect to straight line L1 is set to one-half the angular spacing P used in the arrangement of the three magnetic sensors 11. This makes it possible to make the right plate portion 43 of the right yoke piece 41 parallel to the front portion on the right edge face of the right-side connecting member retaining portion 17 of the bobbin 14 and reduce the distance between the right plate portion 43 and the front portion on the right edge face of the right-side connecting member retaining portion 17 of the bobbin 14.

Further, in the rotation sensing device 1 according to the embodiment of the present invention, the left plate portion 33 covers only the inclined face 21 of the front portion on the left edge face of the left-side connecting member retaining portion 16 of the bobbin 14 from the left, and the right plate portion 43 covers only the inclined face 23 of the front portion on the right edge face of the right-side connecting member retaining portion 17 of the bobbin 14 from the right. With this configuration, even if the spacing between two magnetic sensors 11 adjacent to each other is shortened, the length of the magnetic wire 12 of each magnetic sensor 11 can be further extended. In specific terms, as shown in FIG. 9, the rear end of the left plate portion 33 is located in front of the protruding portion 19. As a result, the protruding portion 19 can be made to protrude to the left to a significant extent and the length of the protruding portion 19 in left-right direction can be extended. In addition, the longer the protruding portion 19 is made in the left-right direction, the farther the left end side of the wire receiving portion 15 can be extended. In a similar manner, the rear end of the right plate portion 43 is located in front of the protruding portion 20. As a result, the protruding portion 20 can be made to protrude to the right to a significant extent and the length of the protruding portion 20 in the left-right direction can be extended, and the longer the protruding portion 20 is made in the left-right direction, the farther the right end side of the wire receiving portion 15 can be extended. Extending both ends of the wire receiving portion 15 in this manner makes it possible to extend the maximum length of the magnetic wire 12 that can be received within the wire receiving portion 15. In addition, due to the fact that the rear end of the left plate portion 33 is located in front of the protruding portion 19 and the rear end of the right plate portion 43 is located in front of the protruding portion 20, in two magnetic sensors 11 adjacent to each other in the circumferential direction, neither the right plate portion 43 nor the left plate portion 33 is interposed between the right end of the protruding portion 20 of the bobbin 14 of the magnetic sensor 11 on the counterclockwise side and the left end of the protruding portion 19 of the bobbin 14 of the magnetic sensor 11 on the clockwise side. Consequently, the right end of the protruding portion 20 and the left end of the protruding portion 19 of these two magnetic sensors 11 can be brought closer to each other, thereby making it possible to shorten the spacing between the two magnetic sensors 11 adjacent to each other and the rotation sensing device 1 can be made more compact.

Further, in the rotation sensing device 1 according to the embodiment of the present invention, the left yoke piece 31 of each yoke 30 has a left upper plate portion 34, and the range covered by the left upper plate portion 34 remains above the left-side connecting member holding portion 16 and does not extend to above the coil 13. In addition, the right yoke piece 41 of each yoke 30 has a right upper plate portion 44 and the range covered by the right upper plate portion 44 remains above the right-side connecting member retaining portion 17 and does not extend to above the coil 13. In other words, neither the left upper plate portion 34 nor the right upper plate portion 44 enters the region above the coil 13, and the coil 13 is not covered by the yoke 30 from above. Along with making it possible to increase the amount of windings of the coil 13, this configuration makes it possible to bring the left upper plate portion 34 and the right upper plate portion 44 respectively closer to the left end portion and the right end portion of the magnetic wire 12. In specific terms, when the amount of the conductor wire of the coil 13 wound upon the conductor winding portion 18 of the bobbin 14 is increased, the diameter of the coil 13 is expanded. Since increasing the amount of windings of the conductor wire of the coil 13 could create the risk that the outer surface of the coil 13 might make contact with the left upper plate portion 34 or the right upper plate portion 44, if the left upper plate portion 34 or the right upper plate portion 44 were to cover the region above the coil 13, the amount of windings of the conductor wire of the coil 13 is restricted in order to avoid this. In the present embodiment, neither the left upper plate portion 34 nor the right upper plate portion 44 reach above the coil 13, and, as a result, the coil 13 is not covered by the yoke 30 from above. Consequently, even if the amount of windings of the conductor wire of the coil 13 is increased, the outer surface of the coil 13 will not make contact with the left upper plate portion 34 or the right upper plate portion 44. Therefore, the amount of windings of the coil 13 can be increased as long as the outer surface of the coil 13 does not make contact with the right end of the left front plate portion 32 or the left end of the right front plate portion 42. Increasing the amount of windings of the conductor wire of the coil 13 makes it possible to increase the height (voltage) of the pulse output from the coil 13 as a result of reversal of the direction of magnetization of the magnetic wire 12. Therefore, the accuracy in sensing the rotation of the rotary shaft 83 can be improved. In addition, since neither the left upper plate portion 34 nor the right upper plate portion 44 enters the region above the coil 13, even if the amount of windings of the coil 13 is increased, as shown in FIG. 11, the position of the bottom faces of the left upper plate portion 34 and the right upper plate portion 44 in the up-down direction can be at or below the position of the uppermost portion of the outer surface of the coil 13. Therefore, the left upper plate portion 34 and the right upper plate portion 44 can be brought closer respectively to the left end portion and the right end portion of the magnetic wire 12. This makes it possible to increase the extent to which the magnetic flux of the magnetic field formed by the magnet 3 is focused on the magnetic wire 12 when the N poles and S poles of the magnet 3 approach the magnetic sensor 11, for example, as shown in FIG. 13.

In addition, in the rotation sensing device 1 according to the embodiment of the present invention, the right face 34A of the left upper plate portion 34 of the left yoke piece 31 and the left face 44A of the right upper plate portion 44 of the right yoke piece 41 are perpendicular to the central axis B of the magnetic wire 12 and extend above the magnetic wire 12 in the forward-backward direction. When the N poles and S poles of the magnet 3 approach the magnetic sensor 11, for example, as shown in FIG. 13, this configuration, as described above, makes it possible to increase the magnetic flux flowing along the direction of the central axis B of the magnetic wire 12. Therefore, the accuracy in sensing the rotation of the rotary shaft 83 can be increased.

In addition, in the rotation sensing device 1 according to the embodiment of the present invention, the dummy yoke pieces 51, 52 can equalize the strength of the rotating magnetic field acting on the magnetic wire 12 of each magnetic sensor 11 in all three magnetic sensors 11. Therefore, the accuracy in sensing the rotation of the rotary shaft 83 can be improved.

It should be noted that, while the magnet 3 used in the above embodiment has two pairs of magnetic poles consisting of an N pole, an S pole, an N pole and an S pole, in the present invention, the magnet may have 1 pair or 3 pairs or more of magnetic poles. In addition, the magnet 3 may be cut into quarters and a rotating magnetic field may be formed using four magnets 3. Further, while the rotation sensing device 1 of the above embodiment comprises three magnetic sensors 11 and three yokes 30, in the present invention, the number of the magnetic sensors 11 and yokes 30 may be 2, 4 or more. In addition, the present invention can be used to sense the rotation of objects other than rotary shafts of motors. In addition, while the embodiment described above used an example in which the magnet 3 rotates relative to the magnetic sensors 11 and the yokes 30, it is possible to use a configuration in which the magnetic sensors 11 and the yokes 30 rotate relative to the magnet 3.

In addition, in the present invention, appropriate modifications can be made without departing from the gist or idea of the invention that can be read from the claims and the specification as a whole, and rotation sensing devices resulting from such modifications are also included in the technical concept of the present invention.

DESCRIPTION OF THE REFERENCE NUMERALS

1 Rotation sensing device
2 Base
2B Mounting face (one face)
3 Magnet (magnetic field forming portion)
11 Magnetic sensor (magnetic field sensing portion)
12 Magnetic wire
13 Coil
14 Bobbin
15 Wire receiving portion
18 Conductor winding portion
30 Yoke
31 Left yoke piece
32 Left front plate portion
33 Left plate portion
34 Left upper plate portion
34A Right face
41 Right yoke piece
42 Right front plate portion
43 Right plate portion
44 Right upper plate portion
44A Left face
51 Dummy yoke piece (first dummy yoke piece)
52 Dummy yoke piece (second dummy yoke piece)
81 Motor (structure)
82 Motor main body (supporting portion)
83 Rotary shaft (rotating portion)

The invention claimed is:

1. A rotation sensing device that is provided within a structure having a supporting portion and a rotating portion which rotates, in relative terms, with respect to the supporting portion, and that senses the rotation of the rotating portion with respect to the supporting portion, wherein the device comprises:
   a base that is secured to the supporting portion and has one face parallel to a plane orthogonal to a rotational axis of the rotating portion;
   a magnetic field forming portion that is secured to the rotating portion, rotates along with the rotating portion about the rotational axis, and forms a magnetic field around the rotational axis;
   a plurality of magnetic field sensing portions that are secured to said one face of the base, are arranged with equal angular spacing to one another in a circumferential direction on an outer periphery of a rotational trajectory of the magnetic field forming portion, and sense the magnetic field formed by the magnetic field forming portion; and
   a plurality of yokes that are secured to said one face of the base, are arranged on the outer periphery of the rotational trajectory in one-to-one correspondence with the plurality of magnetic field sensing portions, and control a magnetic flux of the magnetic field formed by the magnetic field forming portion;
   the magnetic field sensing portions comprise:
      a magnetic wire extending in a direction parallel to a tangent of the rotational trajectory,
      a coil provided on an outer periphery of the magnetic wire, and
      a bobbin holding the magnetic wire and the coil; and,
      for each magnetic field sensing portion, the direction of extension of the rotational axis is an up-down direction, the direction of extension of the magnetic wire is a left-right direction, the direction of extension of a straight line orthogonal to both the rotational axis and the magnetic wire is a forward-backward direction, the direction in which said one face of the base is facing is "up", the direction toward the rotational axis in the forward-backward direction is "front", a left and a right of each magnetic field sensing portion are defined by viewing each magnetic field sensing portion from the front thereof as a point of reference,
   the bobbin is formed in a columnar shape extending in the left-right direction; a wire receiving portion, in which the magnetic wire is received, is formed inside the bobbin; a conductor winding portion, which is a central portion of the bobbin in the left-right direction and around which a conductor wire of the coil is wound, is formed on the outer periphery of the wire receiving portion;
   each yoke comprises a left yoke piece that partially covers the left portion of the magnetic field sensing portion, and a right yoke piece that partially covers the right portion of the magnetic field sensing portion;
   the left yoke piece has a left front plate portion, which extends linearly from the front of the left portion of the bobbin, which is left of the conductor winding portion, to the front of the coil; the left front plate portion is inclined with respect to the direction of extension of the magnetic wire such that a right end of said left front plate portion is located rearwardly of the left end of said left front plate portion;

the right yoke piece has a right front plate portion, which is in the right portion of the bobbin and extends linearly from the front of the right portion of the bobbin, which is right of the conductor winding portion, to the front of the coil; the right front plate portion is inclined with respect to the direction of extension of the magnetic wire such that the left end of said right front plate portion is located rearwardly of the right end of said right front plate portion;

and the right end of the left front plate portion and the left end of the right front plate portion are mutually opposed across a gap in front of the central portion of the coil in the left-right direction.

2. The rotation sensing device according to claim 1, wherein the left yoke piece has a left plate portion covering the bobbin from a left side of said bobbin, with the left plate portion being inclined with respect to a straight line orthogonal to both the rotational axis and the magnetic wire such that a rear end of said left plate portion is located to the left of the front end of said left plate portion, and the right yoke piece has a right plate portion covering the bobbin from the right side of said bobbin, with the right plate portion being inclined with respect to a straight line orthogonal to both the rotational axis and the magnetic wire such that the rear end of said right plate portion is located to the right of the front end of said right plate portion.

3. The rotation sensing device according to claim 2, wherein the left plate portion is inclined with respect to a straight line orthogonal to both the rotational axis and the magnetic wire by an angle equal to one-half the angular spacing such that the rear end of said left plate portion is located to the left of the front end of said left plate portion, and the right plate portion is inclined with respect to a straight line orthogonal to both the rotational axis and the magnetic wire by an angle equal to one-half the angular spacing such that the rear end of said right plate portion is located to the right of the front end of said right plate portion.

4. The rotation sensing device according to claim 2, wherein the left plate portion covers only a section of the bobbin forward of a center in the forward-backward direction from the left side of said bobbin, and the right plate portion covers only the section of the bobbin forward of the center in the forward-backward direction from the right side of said bobbin.

5. The rotation sensing device according to claim 1, wherein the plurality of magnetic field sensing portions and the plurality of yokes are arranged respectively in one-to-one correspondence on said one face of the base on an arc centered on the rotational axis, and, when said one face is viewed from above the plurality of magnetic field sensing portions, a first dummy yoke piece having a same configuration as the left yoke piece is arranged on a clockwise side of the magnetic field sensing portion arranged on a most clockwise side among the plurality of magnetic field sensing portions, a second dummy yoke piece having a same configuration as the right yoke piece is arranged on a counterclockwise side of the magnetic field sensing portion arranged on a most counterclockwise side among the plurality of magnetic field sensing portions, and, on said one face, there are neither magnetic field sensing portions corresponding to the first dummy yoke piece nor magnetic field sensing portions corresponding to the second dummy yoke piece.

\* \* \* \* \*